(12) United States Patent
De Marco et al.

(10) Patent No.: US 12,218,583 B2
(45) Date of Patent: Feb. 4, 2025

(54) MULTI-LEVEL POWER CONVERTER WITH ADDITIONAL FLY CAPACITOR

(71) Applicant: Apple Inc., Cupertino, CA (US)

(72) Inventors: Louis De Marco, Swindon (GB); Vincenzo Bisogno, Swindon (GB)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 17/820,477

(22) Filed: Aug. 17, 2022

(65) Prior Publication Data

US 2024/0063716 A1     Feb. 22, 2024

(51) Int. Cl.
*H02M 3/07* (2006.01)
*H02M 1/00* (2006.01)

(52) U.S. Cl.
CPC ........... *H02M 3/07* (2013.01); *H02M 1/0095* (2021.05)

(58) Field of Classification Search
CPC .............................. H02M 1/0095; H02M 3/07
See application file for complete search history.

(56) References Cited

U.S. PATENT DOCUMENTS

| | | | |
|---|---|---|---|
| 6,643,151 B1 | 11/2003 | Nebrigic et al. | |
| 7,570,030 B2 | 8/2009 | Effing | |
| 10,084,384 B1* | 9/2018 | Kotikalapoodi | H02M 3/158 |
| 2020/0373839 A1 | 11/2020 | Fu et al. | |
| 2021/0234462 A1* | 7/2021 | Cannillo | G05F 1/595 |
| 2023/0170804 A1* | 6/2023 | Tsai | H02M 3/07 |
| 2023/0238887 A1* | 7/2023 | Lim | H02M 1/0095 |
| 2023/0268835 A1* | 8/2023 | Lesso | H02M 3/1582 323/271 |

* cited by examiner

*Primary Examiner* — Harry R Behm
(74) *Attorney, Agent, or Firm* — Kowert, Hood, Munyon, Rankin & Goetzel, P.C.; Dean M. Munyon

(57) ABSTRACT

A power converter circuit that includes two flying capacitors, is coupled to a regulated power supply node in a computer system. The power converter circuit magnetizes an inductor using the two flying capacitors during a first phase. During a second phase, the power converter circuit charges one of the flying capacitors, de-magnetizes the inductor, and transfers charge to the regulated power supply node. The power converter circuit magnetizes the inductor using the flying capacitors, and transfers charge to the regulated power supply node during a third phase. During a fourth phase, the power converter circuit again de-magnetizes the inductor, charges the one of the flying capacitors, and transfers charge to the regulated power supply node.

20 Claims, 21 Drawing Sheets

MULTI-LEVEL POWER CONVERTER WITH ADDITIONAL FLY CAPACITOR

BACKGROUND

Technical Field

This disclosure relates to power management in computer systems and, more particularly, to power converter circuit operation.

Description of the Related Art

Modern computer systems may include multiple circuit blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulated voltage levels on respective power supply signals using an input power supply signal. Such power converter circuits may employ multiple passive circuit elements such as inductors, capacitors, and the like.

Figure 1:
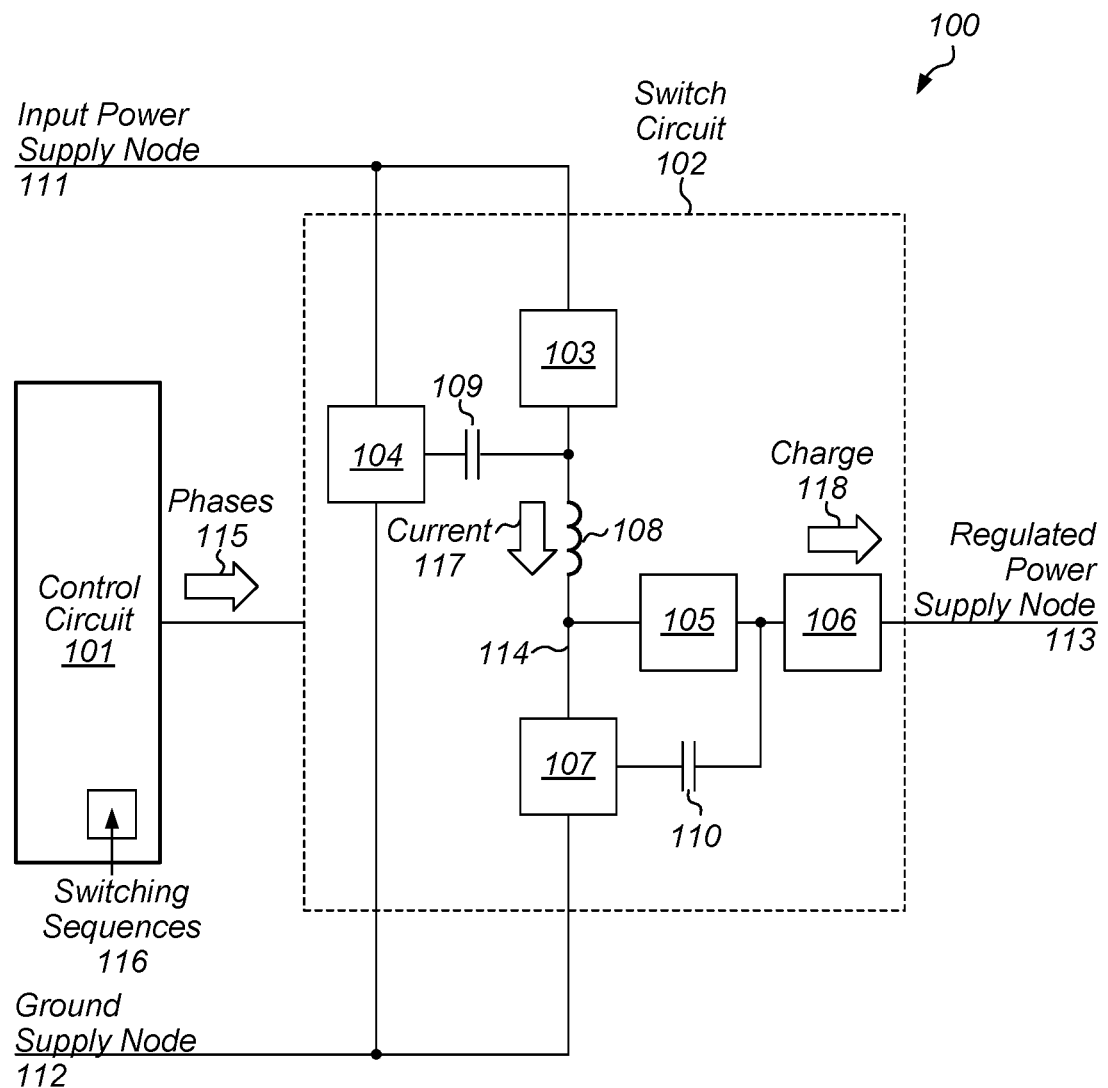
FIG. 1 is a block diagram of an embodiment of a multi-level boost power converter circuit for a computer system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents, and alternatives falling within the spirit and scope of the appended claims.

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck power converter circuit (or simply "buck converter circuit"). Such converter circuits include multiple switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node and is referred to as the "low-side switch."

In addition to buck converter circuits which generate a regulated output voltage level that is less than a voltage level of an input power supply, PMUs may also include boost converter circuits and inverting buck-boost converter circuits. Boost converter circuits can generate regulated output voltage levels greater than the voltage level of the input power supply, while inverting buck-boost converter circuits can generate a regulated output voltage that has an opposite polarity of the input power supply and whose magnitude is either greater than or less than the voltage level of the input power supply.

When the high-side switch is closed (referred to as "on-time"), energy is applied to the inductor, resulting in an increase in the current flowing through the inductor. During this time, the inductor stores energy in the form of a magnetic field in a process referred to as "magnetizing" the inductor. When the high-side switch is opened and the low-side switch is closed, energy is no longer being applied to the inductor and the voltage across the inductor reverses, which results in the inductor functioning as a current source with the energy stored in the inductor's magnetic field supporting the current flowing into the load. The process of generating a current using the inductor's collapsing magnetic field is referred as "de-magnetizing" the inductor. The cycle of closing and opening the high-side and low-side switches is performed periodically to maintain a desired voltage level on the power supply node.

The opening and closing of the switches within a power converter circuit is commonly performed in accordance with a switching sequence which includes multiple cycles (or "phases"). As used and described herein, a switching sequence specifies that one or more switches of a power converter circuit are closed or opened during each cycle of multiple cycles specified in the switching sequence. Some power converter circuits can employ multiple switching sequences. The selection of which switching sequence is used at any given time may be based on a variety of criteria such as a voltage level of the input power supply node, a voltage level of a regulated output power supply node, and the like.

To reduce the voltage level across the inductor and switch devices in a power converter circuit, some power converter circuits include a capacitor (referred to as a "flying capacitor" or "fly capacitor") that floats between switch nodes within the power converter circuit. The fly capacitor can act as a second source when being discharged and can, in some cases, reduce the voltage level across the inductor or switch devices by half.

The most expensive element in the power converter circuit is generally the inductor. Additionally, the inductor may be the physically largest component of the power converter circuit as well. As mentioned above, employing switched-capacitor techniques, e.g., the use of a fly capacitor, can reduce the magnetic flux applied to the inductor, allowing for smaller inductors and reduced magnetic losses in the inductor. Moreover, the voltage stress across the switches can be reduced allowing for smaller devices and reducing the overall circuit area and switching losses.

The benefits of fly capacitors are, however, limited. In many power converter circuits that include fly capacitors, two magnetization and two de-magnetization phases are used in a switching sequence in order to maintain a steady-state voltage across the flying capacitors. Under certain conditions, for example, when the input voltage is less than half of the output voltage, only the second de-magnetization phase transfers charge to the output of a power converter circuit, limiting the transient performance of such power converter circuits.

To improve the transient response of a power converter circuit, additional fly capacitors may be employed. The embodiments illustrated in the drawings and described below may provide techniques for a power converter circuit with more than one fly capacitor to use additional switching sequences selected based on respective voltage levels of an input power supply node and a regulated power supply node that allow for more phases in which charge is transferred to the regulated power supply node. By transferring charge to the regulated power supply node in more than one cycle, the transient response of the power converter circuit can be improved. Additionally, additional fly capacitors can allow further reduction in the voltage levels across the inductor and switches, thereby allowing for smaller and more efficient components to be employed.

Turning to FIG. 1, a block diagram of a multi-level boost converter circuit is depicted. As illustrated, multi-level boost converter circuit 100 includes control circuit 101 and switch circuit 102. In various embodiments, switch circuit 102 is coupled to input power supply node 111 and includes switch devices 103-107, inductor 108, and capacitors 109 and 110.

Switch device 104 is coupled to input power supply node 111, ground supply node 112, and capacitor 109. Switch device 103 is coupled to input power supply node 111, capacitor 109 and inductor 108. Switch device 105 is coupled to node 114 (also referred to as a "switch node") and capacitor 110. Inductor 108 is also coupled to node 114, as is switch device 107, which is also coupled to capacitor 110 and ground supply node 112. Switch device 106 is coupled to switch device 105, capacitor 110, and regulated power supply node 113.

Switch circuit 102 is configured to magnetize inductor 108 using capacitor 109 and capacitor 110 during a first phase of a particular switching sequence of switching sequences 116. Switch circuit 102 is further configured to de-magnetize inductor 108, to charge capacitor 109, and transfer charge to regulated power supply node 113 during a second phase of the particular switching sequence.

In various embodiments, switch circuit 102 is further configured to magnetize inductor 108 using capacitor 109 and capacitor 110, and to transfer charge 118 to regulated power supply node 113 during a third phase of the particular switching sequence. Switch circuit 102 is additionally configured to de-magnetize inductor 108, charge capacitor 109, and transfer charge 118 to regulated power supply node 113 during a fourth phase of the particular switching sequence.

As used and described herein, a switching sequence specifies one or more devices of a voltage regulator circuit are activated during each phase of a plurality of phases used during the operation of a power converter circuit.

Control circuit 101 is configured to select the particular switching sequence of switching sequences 116 based on respective voltage levels of input power supply node 111 and regulated power supply node 113. In various embodiments, control circuit 101 may be implemented using a state machine or other sequential logic circuit in combination with suitable analog circuits configured to compare respective voltage levels of input power supply node 111 and regulated power supply node 113 to one or more threshold values.

Capacitors 109 and 110 may be implemented using a metal-oxide-metal (MOM) structure, a metal-insulator-metal (MIM) structure, or any other suitable capacitor structure available on a semiconductor manufacturing process. It is noted that capacitors 109 and 110, and inductor 108 may be located on a common integrated circuit with switch devices 103-107 and control circuit 101. Alternatively, capacitors 109 and 110, and inductor 108 may be located on a different integrated circuit than switch devices 103-107 and control circuit 101.

Figure 2:
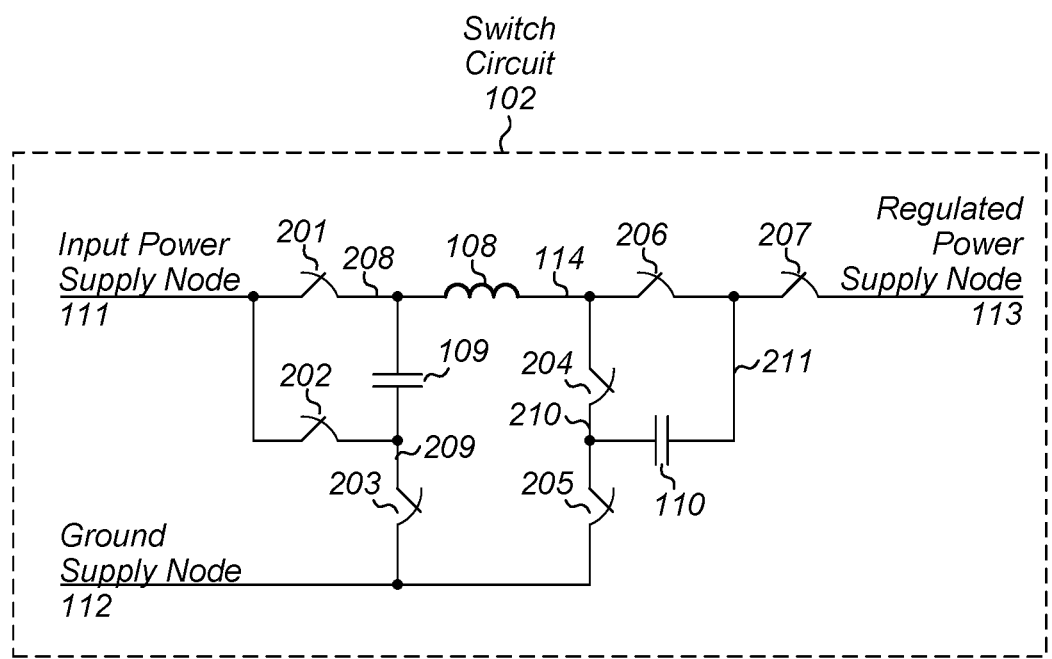
FIG. 2 is a block diagram of an embodiment of a switch circuit included in a multi-level boost converter circuit.

Turning to FIG. 2, a block diagram of an embodiment of switch circuit 102 is depicted. As illustrated, switch circuit 102 includes switches 201-207, inductor 108, and capacitors 109 and 110.

Switch 201 is coupled between input power supply node 111 and node 208. Switch 202 is coupled between input power supply node 111 and node 209, while switch 203 is coupled between node 209 and ground supply node 112. In various embodiments, switch 201 may correspond to switch device 103, and switches 202 and 203 may correspond to switch device 104.

Switch 204 is coupled between node 114 and node 210, while switch 205 is coupled between node 210 and ground supply node 112. Switch 206 is coupled between node 114 and node 211, while switch 207 is coupled between node 211 and regulated power supply node 113. In various embodiments, switches 204 and 205 may correspond to switch device 107, while switches 206 and 207 may correspond to switch devices 105 and 106, respectively.

Capacitor 109 is coupled between node 208 and node 209. In a similar fashion, capacitor 110 is coupled between node 210 and node 211. Inductor 108 is coupled between node 208 and node 114.

As noted above, switch circuit 102 can operate with different switching sequences depending on the relationship between the voltage level of input power supply node 111 and regulated power supply node 113. By using different switching sequences under different voltage conditions, more of the total operating voltage range can be covered with switching sequences that include more than one phase where charge is transferred to regulated power supply node 113, thereby improving transient performance. An example of different switching sequences that can be used by switch circuit 102 are illustrated in Table 1, where closed switches of switches 201-207 are listed for each phase and for each voltage condition. It is noted that $V_{in}$ corresponds to the voltage level of input power supply node 111 and $V_{out}$ corresponds to the voltage level of regulated power supply node 113.

TABLE 1

| Voltage Condition | Phase 1 | Phase 2 | Phase 3 | Phase 4 |
|---|---|---|---|---|
| $V_{in} > \dfrac{V_{out}}{2}$ | 201, 205, 206 | 201, 206, 207 | 201, 204, 207 | 201, 206, 207 |
| $\dfrac{V_{out}}{4} < V_{in} < \dfrac{V_{out}}{2}$ | 202, 206, 205 | 201, 203, 206, 207 | 202, 204, 207 | 201, 203, 206, 207 |
| $V_{in} < \dfrac{V_{out}}{4}$ | 201, 203, 204, 205 | 202, 205, 206 | 201, 203, 204, 205 | 202, 204, 207 |

Although three switching sequences for three voltage conditions are depicted in Table 1, in other embodiments, any suitable number of switching sequences are possible. Moreover, although each of the switching sequences in Table 1 are depicted as having four phases, in other embodiments, different numbers of phases are possible and contemplated.

Switches 201-207 may, in various embodiments, be implemented using any suitable combination of n-channel or p-channel metal-oxide semiconductor field-effect transistors (MOSFETs), fin field-effect transistors (FinFETs), gate-all-around field-effect transistors (GAAFETs), or any other suitable transconductance devices.

Figure 3:
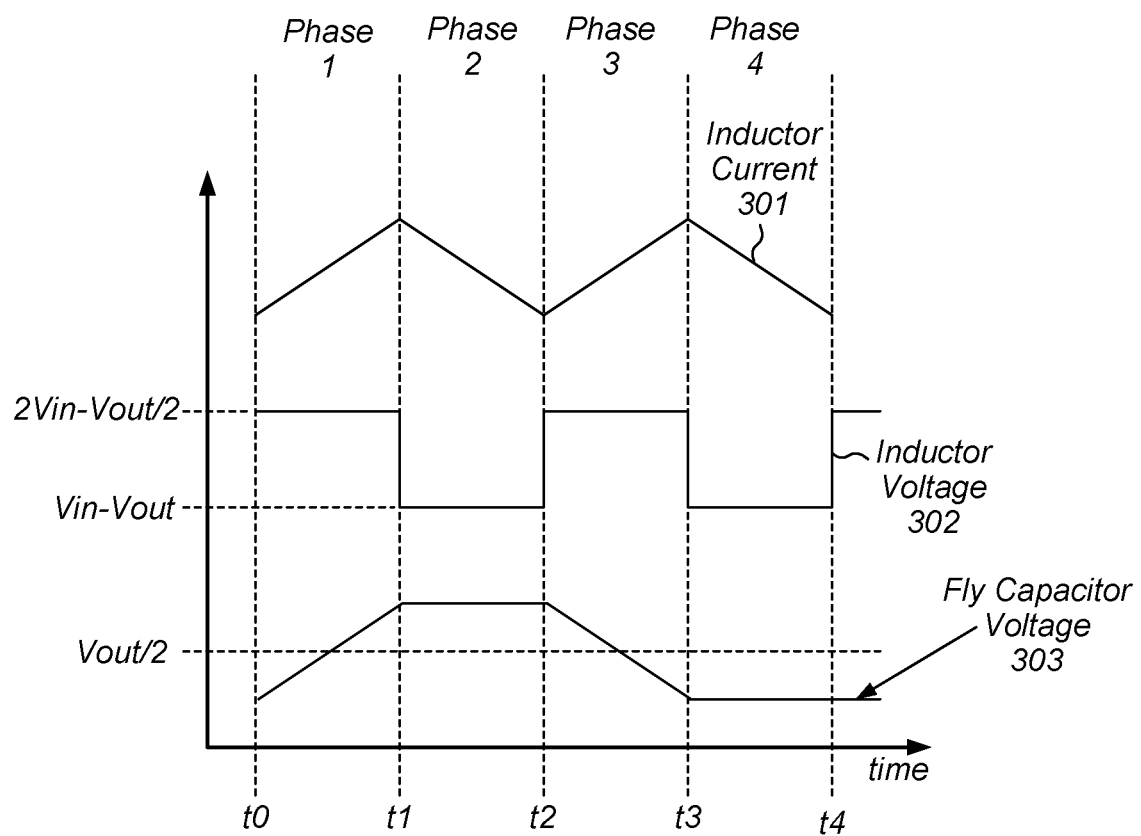
FIG. 3 illustrates example waveforms for a multi-level boost power converter circuit.

Waveforms associated with the operation of multi-level boost converter circuit 100, when the voltage level of input power supply node 111 is greater than one-quarter of the voltage level of regulated power supply node 113, are depicted in FIG. 3. It is noted that these waveforms are merely examples and that, in various embodiments, the waveforms may have different relative magnitudes and timings.

At time t0, phase 1 of phases 115 begins. Inductor voltage 302 (which may correspond to a voltage across inductor 108) is set to a voltage level corresponding to the difference between twice the voltage level of input power supply node 111 ("Vin") and half of the voltage level of regulated power supply node 113 ("Vout"). In response to this voltage, inductor current 301 (which may correspond to current 117 as depicted in FIG. 1) begins to increase. As the current increases in inductor 108, the magnetic field of inductor 108 increases, magnetizing inductor 108. Additionally, capacitor voltage 303, which may correspond to the voltage across capacitor 109, increases as capacitor 109 is charged to the voltage level of input power supply node 111.

At time t1, phase 2 of phases 115 begins. Inductor voltage 302 decreases to a difference between the voltage level of input power supply node 111 ("Vin") and the voltage level of regulated power supply node 113 ("Vout"). In response to this reduction in voltage, inductor current 301 decreases, de-magnetizing inductor 108. Additionally, fly capacitor voltage 303 is held at a voltage level corresponding to the voltage level of input power supply node 111.

At time t2, phase 3 of phases 115 begins. Inductor voltage 302 is again set to the difference between twice the voltage level of input power supply node 111 ("Vin") and half of the voltage level of regulated power supply node 113 ("Vout"), resulting in an increase in inductor current 301. As inductor current 301 increases, inductor 108 is again magnetized. During phase 3, fly capacitor voltage 303 decreases as charge in capacitor 109 is used to provide current to inductor 108.

At time t3, phase 4 of phases 115 begins. Inductor voltage 302 is again set to the difference between the voltage level of input power supply node 111 ("Vin") and the voltage level of regulated power supply node 113 ("Vout"). In response to this reduction in voltage, inductor current 301 decreases as inductor 108 de-magnetizes. During phase 4, fly capacitor voltage 303 is held at ground potential. It is noted that the four phases included in phases 115 can repeat, starting at time t4, while multi-level boost converter circuit 100 is operational.

Figure 4:
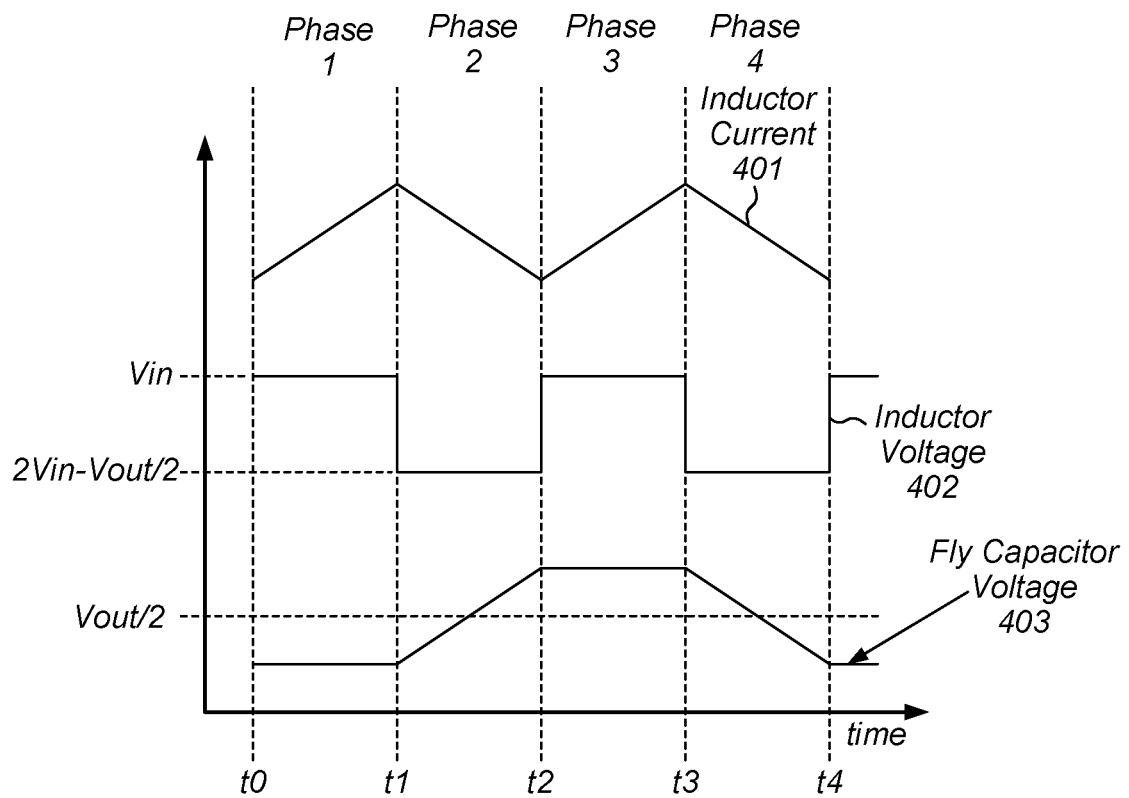
FIG. 4 illustrates additional example waveforms for a multi-level boost power converter circuit.

Waveforms associated with the operation of multi-level boost converter circuit 100 when the voltage level of input power supply node 111 is less than one-quarter of the voltage level of regulated power supply node 113 are depicted in FIG. 4. It is noted that these waveforms are merely examples and that, in various embodiments, the waveforms may have different relative magnitudes and timings.

At time t0, phase 1 of phases 115 begins. Inductor voltage 402 (which may correspond to a voltage across inductor 108) is set to a voltage level corresponding to the voltage level of input power supply node 111 ("Vin"). In response to this voltage, inductor current 401 (which may correspond to current 117 as depicted in FIG. 1) begins to increase, magnetizing inductor 108. Additionally, fly capacitor voltage 403, which may correspond to the voltage across capacitor 109, is held at ground potential.

At time t1, phase 2 of phases 115 begins. Inductor voltage 402 is set to a voltage level corresponding to a difference between twice the voltage level of input power supply node 111 ("Vin") and half of the voltage level of regulated power supply node 113 ("Vout"). The reduction in inductor voltage 402 results in inductor current 401 decreasing and inductor 108 de-magnetizing. Fly capacitor voltage 403 increases as capacitor 109 is charged.

At time t2, phase 3 of phases 115 begins. Inductor voltage 402 is again set to the voltage level corresponding to the voltage level of input power supply node 111 ("Vin"), resulting in an increase in inductor current 401 as inductor 108 is magnetized. During phase 3, fly capacitor voltage 403 is held at the voltage level of input power supply node 111 ("Vin").

At time t3, phase 4 of phases 115 begins. Inductor voltage is again set to the voltage level corresponding to a difference between twice the voltage level of input power supply node 111 ("Vin") and half of the voltage level of regulated power supply node 113 ("Vout"), resulting in a decrease in inductor current 401 and inductor 108 becoming de-magnetized. During this phase, capacitor 109 is coupled in series with inductor 108 and capacitor 110 between input power supply node 111 and ground supply node 112, resulting in charge being depleted from capacitor 109 thereby reducing fly capacitor voltage 403. Phase 4 ends at time t4. At that point, another cycle of phases 1-4 may begin again and continue to repeat while multi-level boost converter circuit 100 is operational.

Figure 5:
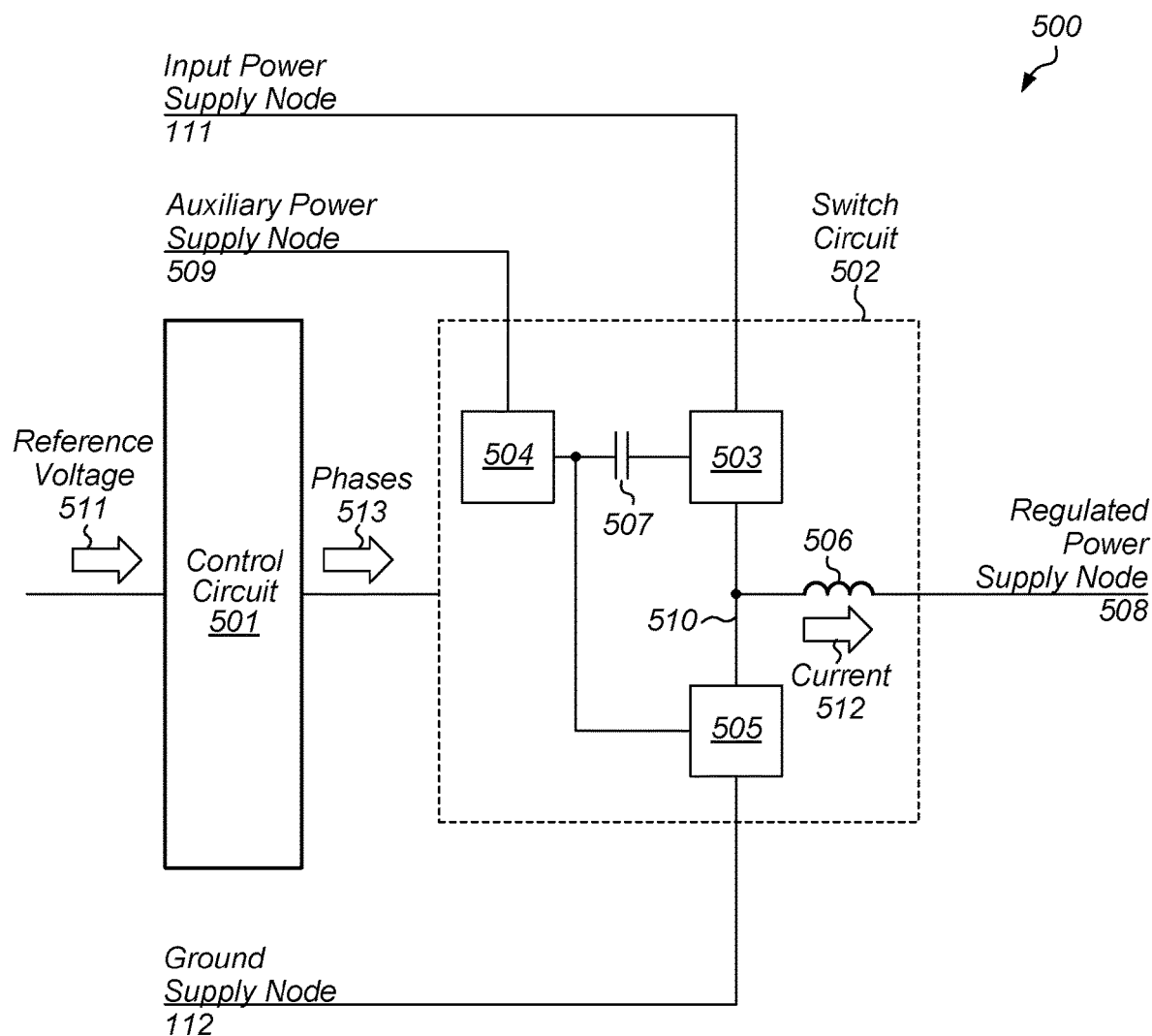
FIG. 5 is a block diagram of an embodiment of a multi-level buck power converter circuit for a computer system.

In some mobile applications, multiple batteries may be connected in series to provide an input voltage for a power converter circuit. In such cases, additional lower voltages from each of the batteries can be advantageously used in a power converter circuit. As noted above, the addition of a fly capacitor can reduce the voltage across the switch devices and the inductor of a power converter circuit. Such a solution, however, can require additional complexity in the control circuit to balance the charge in the fly capacitor over a sequence of phases. By using one of the available lower voltages from one or more of the batteries connected in series as an auxiliary supply to charge the fly capacitor, the additional complexity of the control loop can be avoided. A block diagram of a power converter circuit that uses an auxiliary power supply is depicted in FIG. 5. As illustrated, power converter circuit 500 includes control circuit 501 and switch circuit 502, which includes switch devices 503-505, inductor 506, and capacitor 507.

Switch circuit 502 is configured to magnetize inductor 506 and charge capacitor 507 using respective voltage levels of input power supply node 111 and auxiliary power supply node 509 during a first phase of phases 513. Additionally, switch circuit 502 is also configured to de-magnetize inductor 506 and float capacitor 507 during a second phase of phases 513.

In various embodiments, switch circuit 502 is configured to magnetize inductor 506 and discharge capacitor 507 during a third phase of phases 513. Switch circuit 502 is additionally configured to de-magnetize inductor 506 and float capacitor 507 during a fourth phase of the plurality of phases 513.

Control circuit 501 is configured to adjust a duration of at least one of phases 513 using a voltage level of regulated power supply node 508, reference voltage 511, and current 512 flowing in inductor 506. To adjust the duration of the at least one of phases 513, control circuit 501 may be configured to use any suitable combination of peak-current regulation mode or valley-current regulation mode. In some cases, a determination of which regulation mode to use may be based on the respective voltage levels of input power supply node 111, auxiliary power supply node 509, and regulated power supply node 508. In various embodiments, control circuit 501 may be implemented using a state machine or other sequential logic circuit in combination with suitable analog circuits configured to compare reference voltage 511 to the voltage level of regulated power supply node 508, and to sense a value of current 512.

Capacitor 507 may, in various embodiments, be implemented using a MOM structure, a MIM structure, or any other suitable capacitor structure available in a semiconductor manufacturing process. It is noted that inductor 506 and capacitor 507 may be located on a common integrated circuit with switch devices 503-505. Alternatively, inductor 506 and capacitor 507 may be located on a different integrated circuit than switch devices 503-505.

Figure 6:
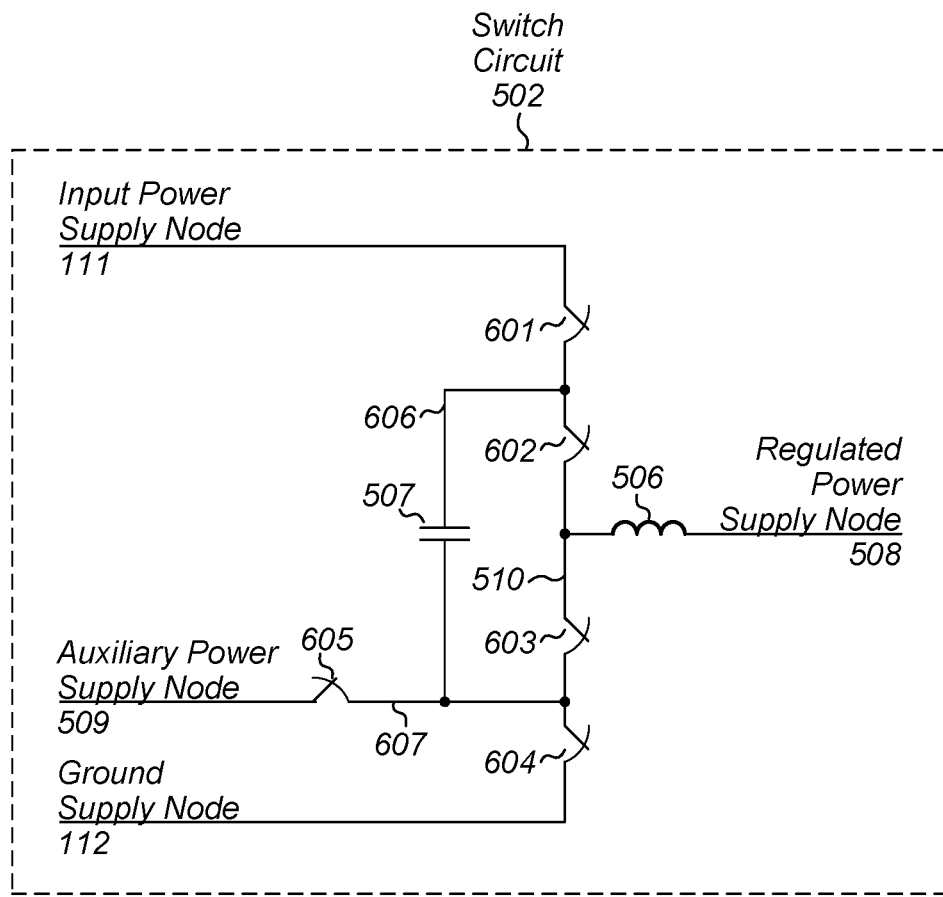
FIG. 6 is a block diagram of an embodiment of a switch circuit included in a multi-level buck power converter circuit.

Turning to FIG. 6, a block diagram of an embodiment of switch circuit 502 is depicted. As illustrated, switch circuit 502 includes switches 601-605, capacitor 507, and inductor 506.

Switch 601 is coupled between input power supply node 111 and node 606, while switch 602 is coupled between node 606 and node 510. Switch 603 is coupled between node 510 and node 607, while switch 604 is coupled between node 607 and ground supply node 112. Switch 605 is coupled between auxiliary power supply node 509 and node 607. Capacitor 507 is coupled between node 606 and node 607. Inductor 506 is coupled between node 510 and regulated power supply node 508.

During a first phase of phases 513, switches 601 and 605 are closed, coupling node 606 to input power supply node 111, and node 607 is coupled to auxiliary power supply node 509, charging capacitor 507 to a voltage level corresponding to a difference between the respective voltage levels of input power supply node 111 and auxiliary power supply node 509.

Additionally, during the first phase, switch 603 is closed, coupling node 510 to node 607, allowing a current to flow from auxiliary power supply node 509 through inductor 506, thereby magnetizing inductor 506 as well as transferring charge to regulated power supply node 508.

During a second phase of phases 513 that is subsequent to the first phase, switches 601 and 605 are opened, while switch 603 remains closed. Additionally, switch 604 is closed, coupling node 510 to ground supply node 112. With node 510 coupled to ground potential, the current flowing through inductor 506 begins to reduce in value as inductor 506 is de-magnetized.

During a third phase of phases 513 that is subsequent to the second phase, switch 602 is closed and switch 603 is opened, coupling capacitor 507 and inductor 506 in series between regulated power supply node 508 and ground supply node 112. With capacitor 507 and inductor 506 coupled together in such a fashion, current can flow from capacitor 507 through inductor 506 into regulated power supply node 508. As the current flows from capacitor 507, inductor 506 is once again magnetized as energy is stored in the magnetic field of inductor 506.

During a fourth phase of phases 513 that is subsequent to the third phase, switch 602 is opened and switch 603 is closed while switch 604 remains closed, coupling node 510 to ground supply node 112. With node 510 coupled to ground potential, the current flowing through inductor 506 begins to reduce in value as inductor 506 is de-magnetized.

Switches 601-605 may, in various embodiments, be implemented using any suitable combination of n-channel or p-channel MOSFETs, FinFETs, GAAFETs, or any other suitable transconductance device.

Figure 7:
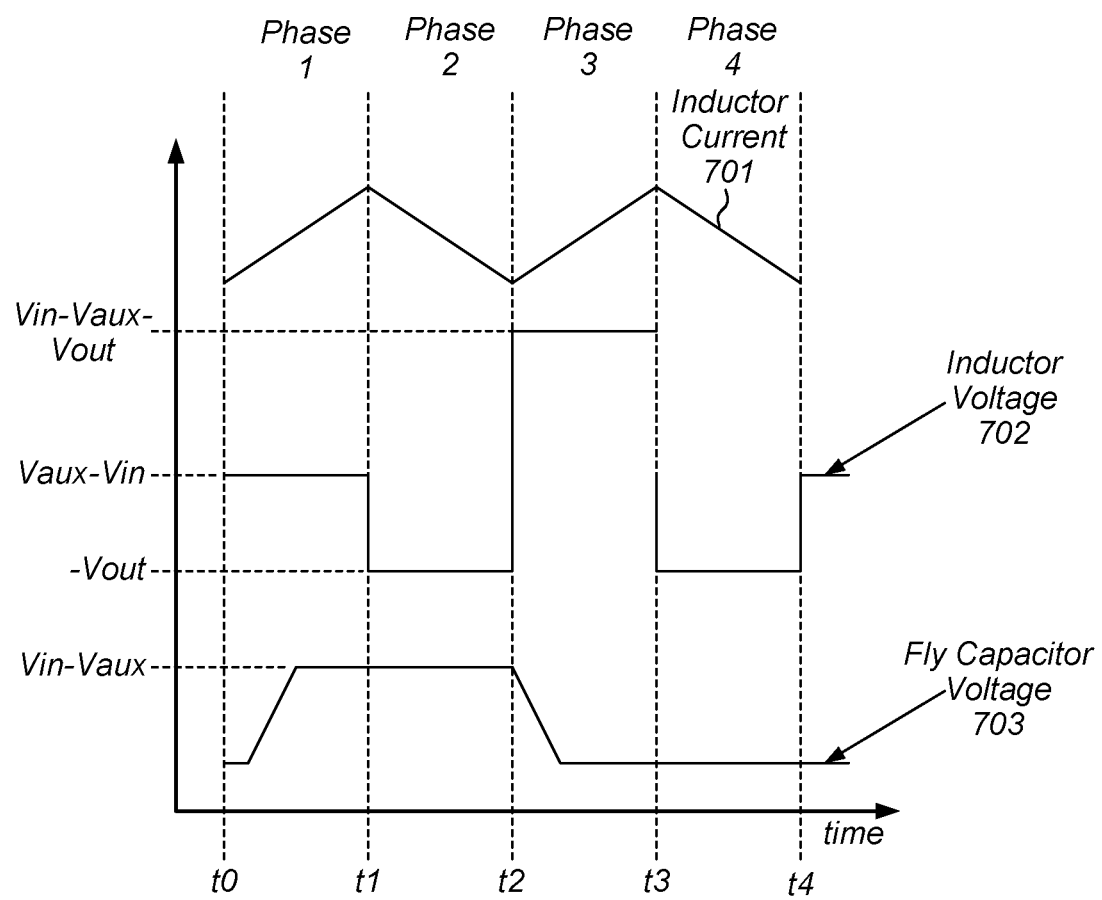
FIG. 7 illustrates example waveforms for a multi-level buck power converter circuit.

Waveforms associated with the operation of power converter circuit 500 are depicted in FIG. 7. It is noted that the waveforms are merely examples and that, in various embodiments, the waveforms may have different relative magnitudes and timings.

At time t0, the first phase of phases 513 begins and inductor current 701 (which may correspond to current 512 as depicted in FIG. 5) begins to increase in response to a voltage level corresponding to the difference between the voltage level of auxiliary power supply node 509 (denoted as "Vaux") and the voltage level of regulated power supply node 508 (denoted as "Vout"). As the current increases in inductor 506, the magnetic field of inductor 506 increases, magnetizing inductor 506. Additionally, during the first phase, capacitor 507 is charged to a voltage level corresponding to the difference between the voltage level of input power supply node 111 (denoted as "Vin") and Vaux.

At time t2, the second phase of phases 513 begins, and inductor 506 is coupled between regulated power supply node 508 and ground supply node 112, resulting in a voltage level of −Vout across inductor 506. Since current is no longer being sourced to inductor 506, the magnetic field of inductor 506 begins to collapse, which allows inductor 506 to continue to source current to regulated power supply node 508.

At time t3, the third phase of phases 513 begins and inductor 506 and capacitor 507 are coupled in series between regulated power supply node 508 and ground supply node 112. The voltage level across inductor 506 increases to a voltage level corresponding to a difference between Vin, Vaux, and Vout, resulting from the voltage level across capacitor 507 and the voltage level of regulated power supply node 508. Charge stored in capacitor 507 moves to regulated power supply node 508 increasing inductor current 701, thereby magnetizing inductor 506.

At time t4, the fourth phase of phases 513 begins and, once again, inductor 506 is coupled between regulated power supply node 508 and ground supply node 112, resulting in a voltage level of −Vout across inductor 506. Since current is no longer being sourced to inductor 506, the magnetic field of inductor 506 begins to collapse, which allows inductor 506 to continue to source current to regulated power supply node 508.

Figure 8:
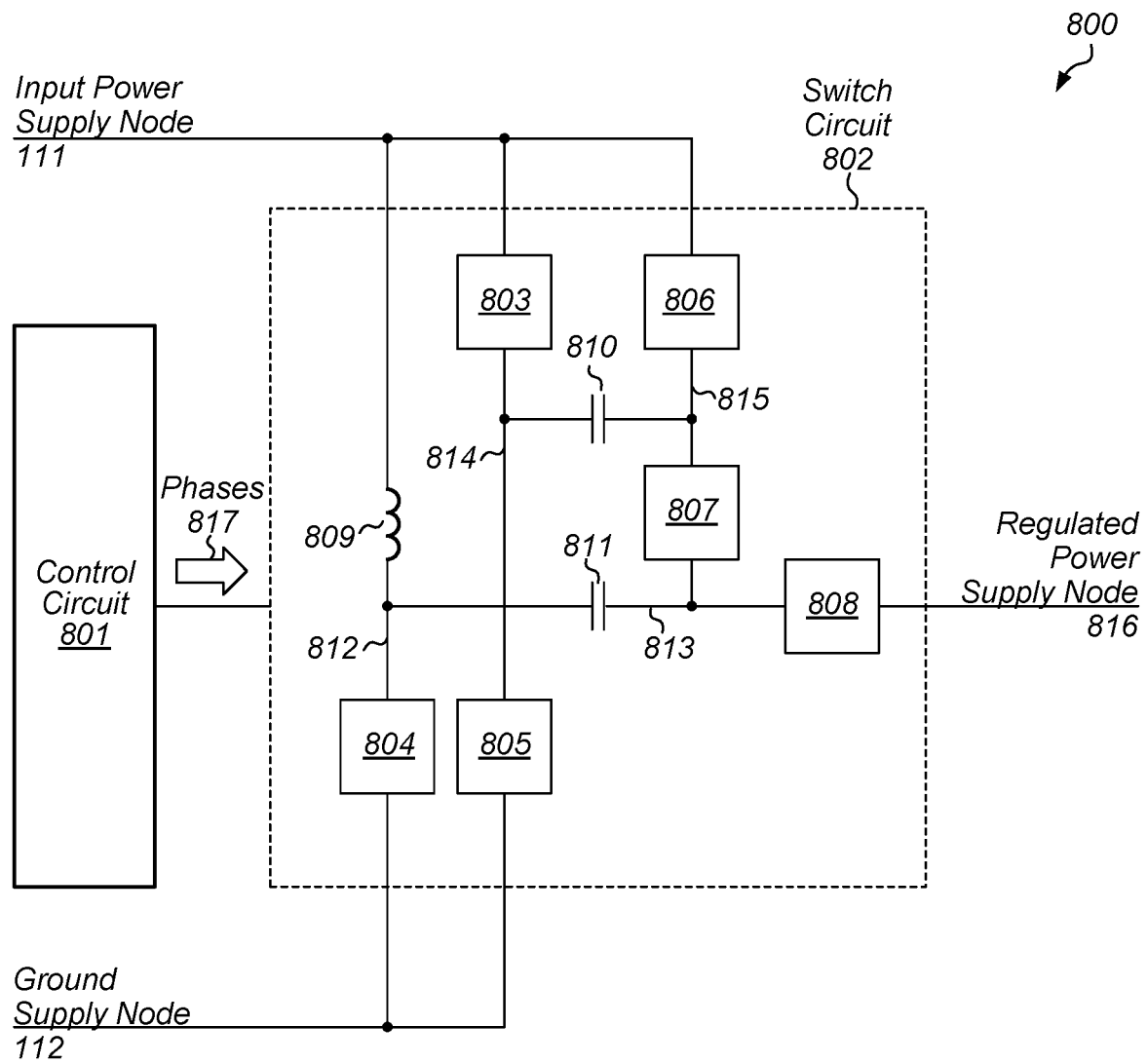
FIG. 8 is a block diagram of an embodiment of a boost power converter circuit with multiple fly capacitors.

As described above, a fly capacitor may be employed to reduce the size of an inductor in a boost power converter circuit. In some cases, however, for large conversion ratios, i.e., the ratio of the voltage level of the output regulated power supply node to the voltage level of the input power supply node, the benefit of the flying capacitor can become negligible. The addition of a second flying capacitor can maintain lower voltages across the inductor even at high conversion ratios. A block diagram of an embodiment of a boost converter circuit is depicted in FIG. 8. As illustrated, power converter circuit 800 includes control circuit 801 and switch circuit 802, which includes switch devices 803-808, inductor 809, and capacitors 810 and 811.

Inductor 809 is coupled between input power supply node 111 and node 812, and switch device 804 is coupled between node 812 and ground supply node 112. Switch device 803 is coupled between input power supply node 111 and node 814, while switch device 805 is coupled between node 814 and ground supply node 112. Switch device 806 is coupled between input power supply node 111 and node 815, and switch device 807 is coupled between node 815 and node 813. Capacitor 810 is coupled between nodes 814 and 815, while capacitor 811 is coupled between nodes 812 and 813. Switch device 808 is coupled between node 813 and regulated power supply node 816.

During a first phase of phases 817 of operation, switch circuit 802 is configured to magnetize inductor 809 and charge capacitor 811. To magnetize inductor 809, switch circuit 802 is further configured to couple node 812 to ground supply node 112, allowing current to flow from input power supply node 111, through inductor 809, and into ground supply node 112. Additionally, switch circuit 802 is configured to couple a first terminal of capacitor 810 to input power supply node 111 and couple a second terminal of capacitor 810 to node 813, allowing a current to flow from input power supply node 111, through capacitors 810 and 811, and into ground supply node 112, thereby charging capacitors 810 and 811. In various embodiments, capacitor 810 is charged to the voltage level of input power supply node 111, and capacitor 811 is charged to a voltage level that is twice that of the voltage level of input power supply node 111.

During a second phase of phases 817, switch circuit 802 is further configured to de-magnetize inductor 809 and transfer charge to regulated power supply node 816. To de-magnetize inductor 809, switch circuit 802 is further configured to de-couple node 812 from ground supply node 112. Additionally, switch circuit 802 is configured to couple node 815 to input power supply node 111, and couple node 813 to regulated power supply node 816. In this phase, the collapsing magnetic field of inductor 809 causes charge to transfer to regulated power supply node 816 via capacitor 811. At the same time, the charge on capacitor 810 is replenished.

The two phases described above can be repeated in order to maintain a desired voltage level on regulated power supply node 816. It is noted that the above two phases do not describe charging capacitors 810 and 811 to their respective steady-state values before operation can begin. As described below, additional switches and capacitors can be included in switch circuit 802 to charge capacitors 810 and 811 during startup of power converter circuit 800.

Control circuit 801 is configured to generate control signals which control the state of switch devices 803-808 during the different ones of phases 817. In various embodiments, control circuit 801 may adjust the duration of different ones of switch devices 803-808 are open or closed based on operating characteristics of power converter circuit 800. For example, control circuit 801 may adjust the values of the control signals based on a current flowing through inductor 809, a voltage level of regulated power supply node 816, or any other suitable operating characteristic of power converter circuit 800. In some embodiments, control circuit 801 may be implemented using any suitable combination of analog circuit, sequential logic circuits, and combinatorial logic circuits.

Capacitors 810 and 811 may, in various embodiments, be implemented using MOM structures, MIM structures, or any other suitable capacitor structures available in a semiconductor manufacturing process. It is noted that inductor 809 and capacitors 810 and 811 may be located on a common integrated circuit with switch devices 803-808. Alternatively, inductor 809 and capacitors 810 and 811 may be located on a different integrated circuit than switch devices 803-808. In some embodiments, one or more of switch devices 803-808 may include FETs with a higher voltage rating, and may be located on a different integrated circuit from other ones of switch devices 803-808 that do not include devices with the higher voltage rating.

Figure 9:
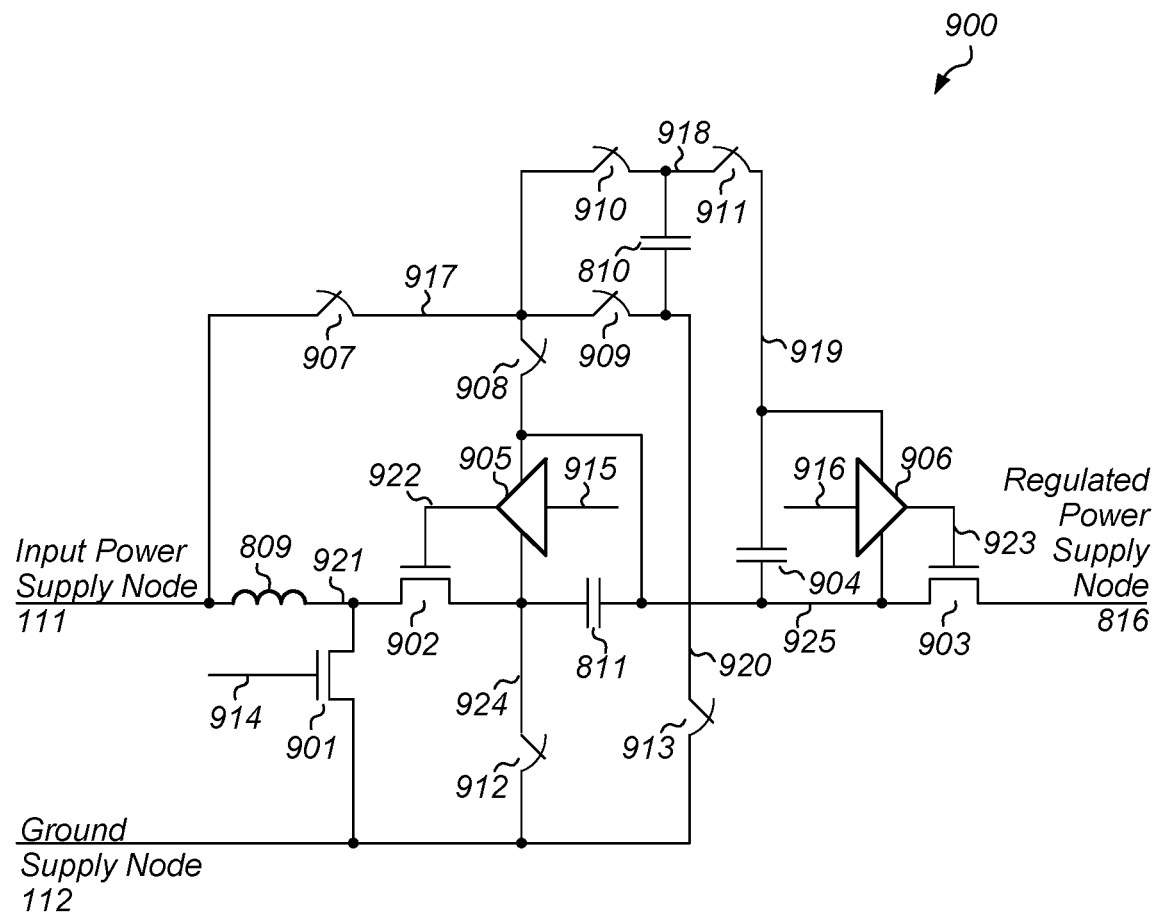
FIG. 9 is a block diagram of an embodiment of a switch circuit for a boost power converter circuit with multiple fly capacitors.

As noted above, switch circuit 802, as depicted in FIG. 8, makes no provision for initializing the charge stored in capacitors 810 and 811 during startup. A block diagram of an embodiment of a switch circuit which may, in some embodiments, correspond to switch circuit 802, is depicted in FIG. 9. As illustrated, switch circuit 900 includes devices 901-903, inductor 809, capacitors 810, 811, and 904, buffers 905 and 906, and switches 907-913.

Inductor 809 is coupled between input power supply node 111 and node 921, while device 901 (also referred to as a "low-side switch") is coupled between node 921 and ground supply node 112 and is controlled by a voltage on node 914. Device 902 (also referred to as an "isolation switch") is coupled between node 921 and node 924, and is controlled by a voltage level of node 922. Switch 912 is coupled between node 924 and ground supply node 112. Capacitor 811 is coupled between node 924 and 925.

Buffer 905 is configured to generate a voltage level on node 922 using the voltage levels of nodes 915, 924, and 925. In various embodiments, buffer 905 may be implemented using multiple inverter circuits or any other suitable non-inverting amplifier circuits. Switch 908 is coupled between node 917 and node 925.

Device 903 (also referred to as a "high-side switch") is coupled between node 925 and regulated power supply node 816, and is controlled by a voltage level of node 923. Buffer 906 is configured to generate a voltage level on node 923 using a voltage level of node 919, a voltage level of node 916, and a voltage level of node 925. Capacitor 904 is coupled between node 919 and node 925. In various embodiments, buffer 906 may be implemented using multiple inverter circuits or any other suitable non-inverting amplifier circuits.

Switch 907 is coupled between input power supply node 111 and node 917. Switch 910 is coupled between node 917 and node 918, while switch 911 is coupled between node 918 and node 919. Capacitor 810 is coupled between node 918 and node 920. Switch 913 is coupled between node 920 and ground supply node 112. Switch 909 is coupled between node 917 and node 920.

In various embodiments, switches 910, 913, 909, and 911, along with capacitor 810, form a charge pump circuit that operates synchronously with phases 817. The charge pump circuit charges capacitor 904 and generates the gate drive voltage level for device 903.

During a magnetization phase of phases 817, devices 901 is active and switches 907, 908, and 912 are closed allowing current to flow through inductor 809 as well as capacitor 811. Additionally, switches 909 and 911 may be closed as part of the operation of the aforementioned charge pump circuit to charge capacitor 904 using charge stored in capacitor 810.

During a de-magnetization phase of phases 817, devices 901 and 903 are active, allowing current to flow into regulated power supply node 816 as the magnetic field of inductor 809 collapses. Additionally, switches 907, 910, and 913 may be closed as part of the operation of the aforementioned charge pump circuit to charge capacitor 811.

It is noted that it is desirable to have the time needed to replenish the charge in capacitor 811 be smaller than the time needed for inductor 809 to reach peak current. Such a condition will allow for switches 908 and 912 to be closed and device 902 to be active while inductor 809 is magnetizing to be ready for the de-magnetization phase.

Figure 10:
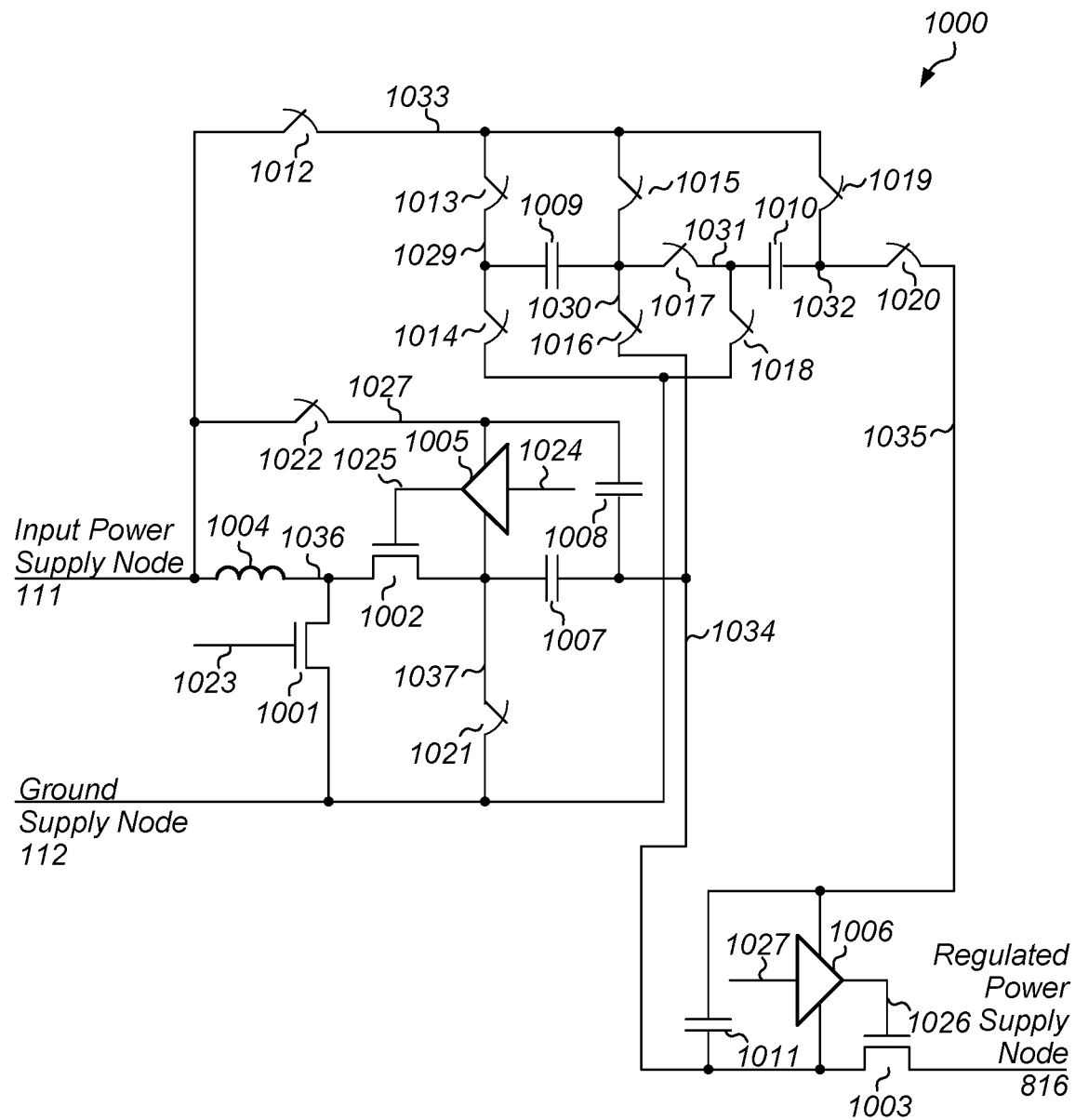
FIG. 10 is a block diagram of a different embodiment of a switch circuit for a boost power converter circuit with multiple fly capacitors.

Another embodiment of a switch circuit for use in a boost power converter circuit is depicted in FIG. 10. As illustrated, switch circuit 1000 includes devices 1001-1003, inductor 1004, buffer circuits 1005 and 1006, capacitors 1007-1011, and switches 1012-1022.

Inductor 1004 is coupled between input power supply node 111 and node 1036, while device 1001 (also referred to as a "low-side switch") is coupled between node 1036 and ground supply node 112 and is controlled by a voltage level of node 1023. Device 1002 (also referred to as an "isolation switch") is coupled between node 1036 and 1037, and is controlled by a voltage level of node 1025. Switch 1021 is coupled between node 1037 and ground supply node 112, while capacitor 1007 is coupled between node 1037 and node 1034.

Buffer circuit 1005 is configured to generate a voltage level on node 1025 using the voltage levels of nodes 1024, 1027, and 1037. In various embodiments, buffer circuit 1005 may be implemented using multiple inverter circuits or any other suitable non-inverting amplifier circuits. Switch 1022 is coupled between input power supply node 111 and node 1027, and capacitor 1008 is coupled between node 1027 and node 1034.

Device 1003 (also referred to as a "high-side switch") is coupled between node 1034 and regulated power supply node 816, and is controlled by a voltage level of node 1026. Buffer circuit 1006 is configured to generate a voltage level on node 1026 using a voltage level of node 1027, a voltage level of node 1035, and a voltage level of node 1034. Capacitor 1011 is coupled between node 1035 and node 1034.

Switch 1012 is coupled between input power supply node 111 and node 1033. Switches 1013, 1015, and 1019 are coupled between node 1033 and nodes 1029, 1030, and 1032, respectively. Capacitor 1009 is coupled between node 1029 and node 1030, and capacitor 1010 is coupled between node 1031 and node 1032, while switch 1017 is coupled between node 1030 and node 1031. Switch 1014 is coupled between node 1029 and ground supply node 112, while switch 1016 is coupled between node 1030 and node 1034. Switch 1018 is coupled between node 1031 and ground supply node 112, while switch 1020 is coupled between node 1032 and node 1035.

At the beginning of a startup sequence, switch 1012 is open, and switches 1021, 1022, 1015, 1014, and 1019 are closed, discharging capacitor 1007. Switch 1012 is slowly closed to control inrush current as capacitors 1009 and 1010 are charged to the voltage level of input power supply node 111.

During a phase where inductor 1004 is magnetized, device 1001 is activated, switches 1012, 1013, 1016, and 1021 are closed, allowing current to flow from input power supply node 111 through inductor 1004 into ground supply node 112. Current additionally flows from input power supply node 111 through capacitors 1007 and 1009 into ground supply node 112 charging the capacitors. Additionally, switch 1022 is closed to charge capacitor 1008, and switches 1017 and 1020 are closed to charge capacitor 1011.

During a phase where inductor 1004 is demagnetized and charge is transferred to regulated power supply node 816, devices 1002 and 1003 are active, while device 1001 is inactive, allowing current generated from the collapsing magnetic field of inductor 1004 to flow into regulated power supply node 816. Additionally, switch 1012 is closed, along with switches 1015 and 1014 to charge capacitor 1009. Switch 1019 and switch 1018 can be periodically closed to charge capacitor 1010. It is noted that the control signals for the switches, devices, and the inputs to the buffers, can be generated by control circuit 801 as described above in regard to FIG. 8.

Once capacitors 1009 and 1010 are charged, the charge pump action of switch circuit 1000 can begin to charge capacitor 1007 and regulated power supply node 816 to twice the voltage level of input power supply node 111. The charge pump action can also charge capacitor 1009 to the voltage level of input power supply node 111. It is noted that during this time, devices 1001 and 1003 are inactive, and once the voltage level of regulated power supply node 816 reaches a level of twice the voltage level of input power supply node 111 minus a diode voltage drop, boost operation can begin.

It is also noted that when boost operation is not operating (e.g., during light load conditions when operating in pulse frequency modulation mode), device 1002 and device 1003 may be kept inactive. In such circumstances, switches 1021 and 1022 may be kept closed to ensure the power supply connection for buffer circuit 1005 is adequate to drive node 1025 when switching resumes. Additionally, charge is replenished in capacitor 1007 and capacitor 1009 so they are ready to resume switching operation.

In various embodiments, devices 1001-1003 may be implemented as n-channel MOSFETs, FinFETs, GAAFETs, or any other suitable transconductance devices. Capacitors 1007-1011 may, in some embodiments, be implemented using MOM structures, MIM structures, or any other suitable capacitor structures available on a semiconductor manufacturing process. In various embodiments, switches 1012-1022 may each be implemented using one or more MOSFETs, FinFETs, GAAFETs, or any other suitable transconductance devices, arranged as a pass-gate circuit, or any other suitable circuit.

Figure 11:
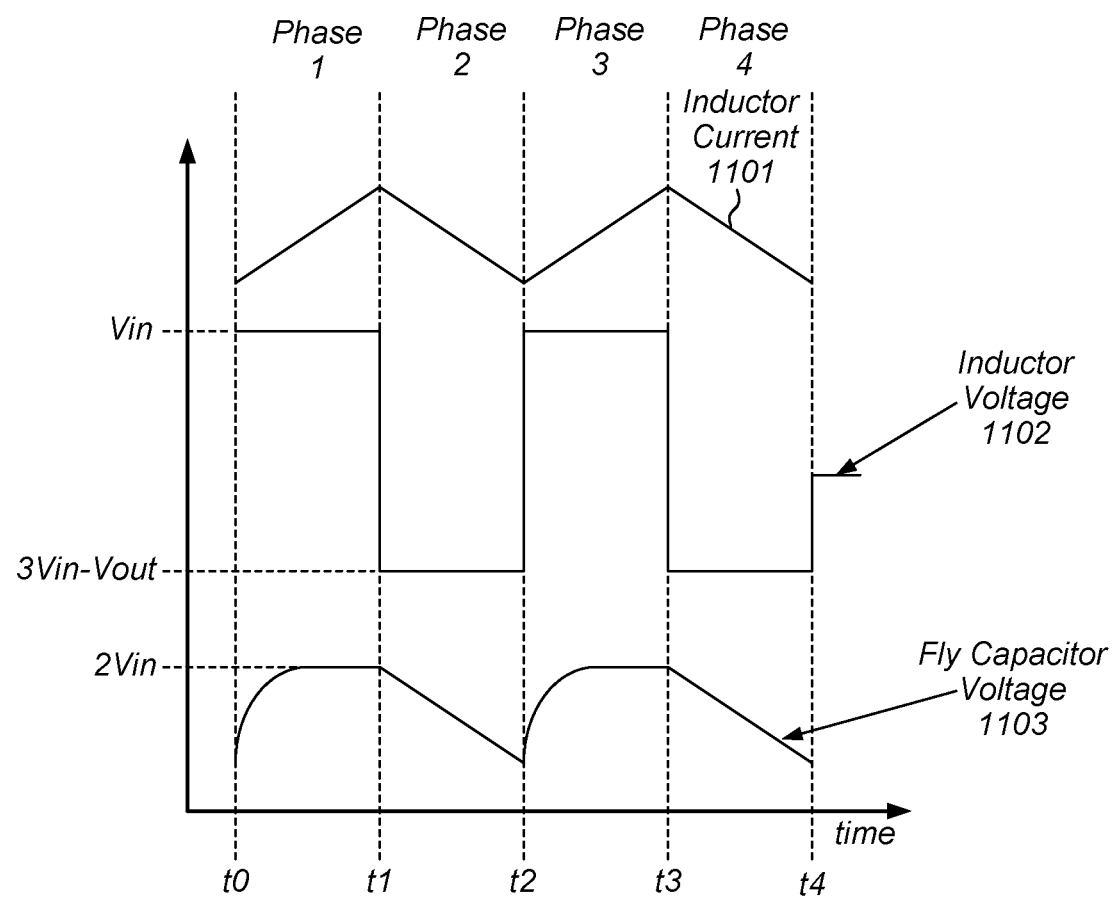
FIG. 11 illustrates example waveforms for a boost power converter circuit with multiple fly capacitors.

Waveforms associated with the operation of a boost power converter circuit that includes multiple fly capacitors are depicted in FIG. 11. It is noted that the waveforms are merely examples and, in various embodiments, the waveforms may have different relative magnitudes and timings.

At time t0, a first phase of phases 817 begins. The voltage across inductor 809 (denoted as "inductor voltage 1102") is set to the voltage level of input power supply node 111 (denoted as "Vin"), causing the current flowing in inductor 809 (denoted as "inductor current 1101") to increase, thereby magnetizing inductor 809. Additionally, capacitors 810 and 811 are charged so that the respective voltages (denoted as "fly capacitor voltage 1103") reaches a level of twice the voltage level of input power supply 111 (denoted as "2Vin").

At time t1, a second phase of phases 817 begins. Inductor voltage 1102 is set to a difference between three times the voltage level of input power supply node 111 and the voltage level of regulated power supply node 816 (denoted as "3Vin–Vout"). This reduction in voltage causes inductor current 1101 to decrease, de-magnetizing inductor 809. Additionally, charge is transferred to regulated power supply node 816, discharging capacitors 810 and 811, thereby reducing fly capacitor voltage 1103.

Phase 3, which starts are time t2, and phase 4, which starts at time t3, have similar waveforms as phase 1 and phase 2, respectively. In some cases, phases 3 and 4 may be used to perform charge pump operations to maintain the charge on boost capacitors as depicted in FIG. 9 and FIG. 10. At the end of phase 4, which occurs at time t4, the cycle of phases may be repeated in order to maintain a desired voltage level on regulated power supply node 816. It is further noted that the duration of any of phases 1-4 may vary from cycle to cycle as adjusted by control circuit 801.

As mentioned above, the design of a switch-mode power converter circuit evolves around the inductor as it is the mostly costly element in the circuit and has a key role in the performance of the switch-mode power converter circuit. To reduce the cost and size of the inductor, fly capacitors, which are less expensive than the inductor, are often employed to reduce the magnetic flux (often measured in "volt-seconds") of the inductor.

Multi-level power converter circuits that use a single flying capacitor can still have voltage levels across switch devices that can necessitate the need for high-voltage switch elements, further contributing to the cost and complexity of the design. Moreover, such multi-level power converter circuits can also require multiple operating modes based on the respective voltage levels of the input power supply nodes and the output power supply nodes of the multi-level power converters circuits.

Figure 12:
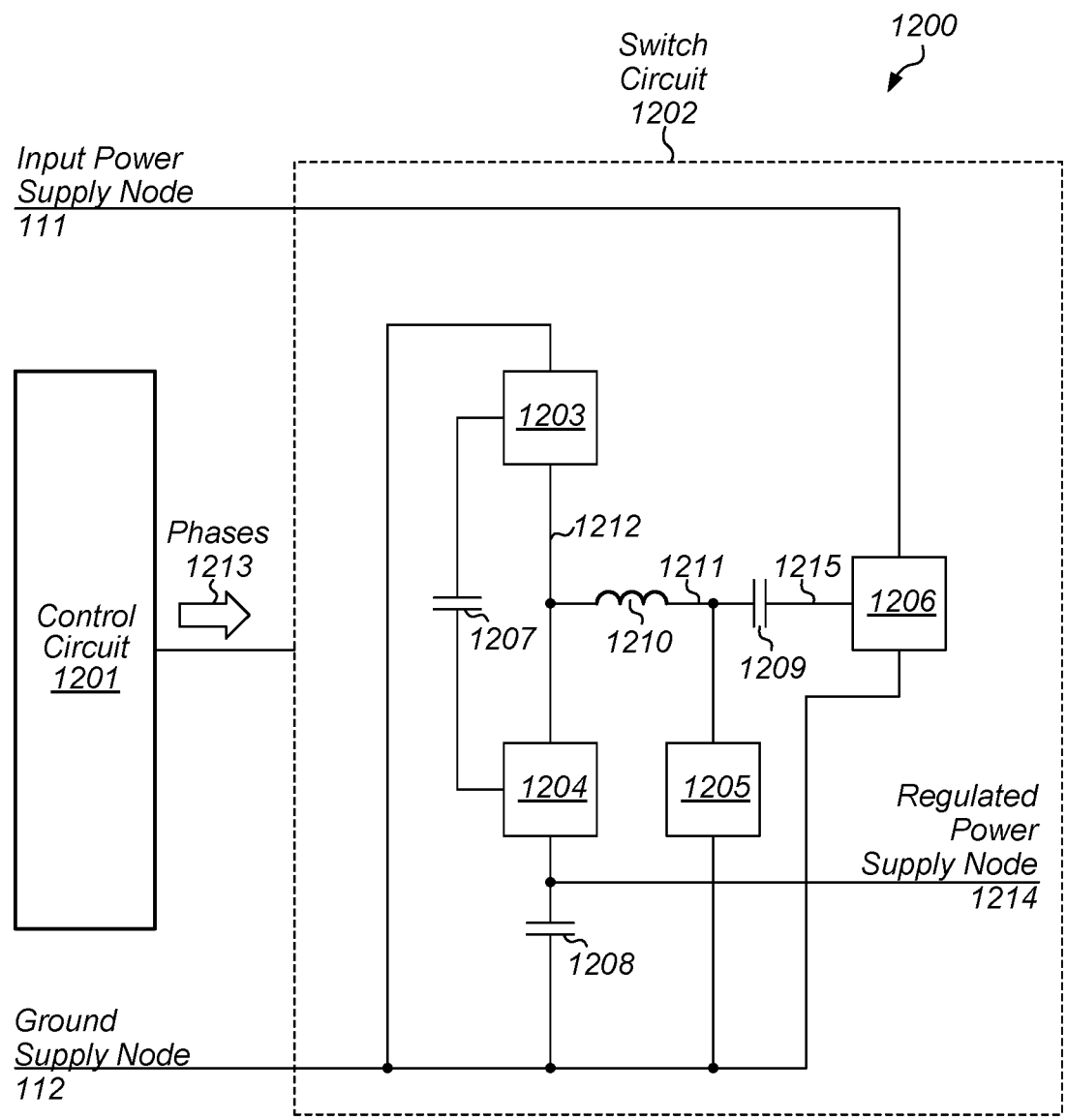
FIG. 12 is a block diagram of an embodiment of an inverting buck-boost converter circuit.

Using a second flying capacitor, however, can remediate the issues described above by reducing the voltage swing across the inductor of a multi-level power converter circuit. By reducing the voltage swing across the inductor, the size of the inductor and/or the magnetic losses of the inductor can be reduced. A block diagram of an embodiment of an inverting buck-boost power converter circuit that employs multiple flying capacitors is depicted in FIG. 12. As illustrated, inverting buck-boost power converter circuit 1200, which may be an embodiment of an inverting buck-boost power converter circuit, includes control circuit 1201 and switch circuit 1202. Inverting buck-boost power converter circuit 1200 is configured to a voltage level on regulated power supply node 1214 that has an opposite polarity to the voltage level of input power supply node 111. It is noted that power converter circuit 1200 can operate in buck mode (or "step-down mode") or in boost mode ("step-up mode").

Switch circuit 1202 includes switch devices 1203-1206, capacitors 1207-1209, and inductor 1210. Switch device 1203 is coupled between node 1212 and ground supply node 112, while switch device 1204 is coupled between node 1212 and regulated power supply node 1214. Switch device 1205 is coupled between node 1211 and ground supply node 112, while switch device 1206 is coupled between input power supply node 111, node 1215, and ground supply node 112. Capacitor 1207 is coupled between switch devices 1203 and 1204, while capacitor 1208 is coupled between regulated power supply node 1214 and ground supply node 112. Capacitor 1209 is coupled between node 1211 and node 1215, while inductor 1210 is coupled between node 1212 and node 1211.

Switch circuit 1202 is configured to magnetize inductor 1210 using capacitor 1209 during a first phase of phases 1213. During a second phase of phases 1213 that is subsequent to the first phase, switch circuit 1202 is further configured to de-magnetize inductor 1210 using capacitor 1207, and to charge capacitor 1209 using input power supply node 111.

Switch circuit 1202 is also configured to magnetize inductor 1210 using capacitor 1209 during a third phase of phases 1213 that is subsequent to the second phase. During a fourth phase of phases 1213 that is subsequent to the third phase, switch circuit 1202 is further configured to charge capacitor 1209 using input power supply node 111. Additionally, switch circuit 1202 is also configured to de-magnetize inductor 1210 using capacitors 1207 and 1208. It is noted that de-magnetizing inductor 1210 during the fourth phase results in a current flowing through capacitor 1208 that generates a particular voltage level on regulated power supply node 1214. It is noted that if the charge sourced by inductor 1210 when it is de-magnetized remains the same in the second and fourth phases, the voltage level across capacitor 1207 may be maintained at a voltage level around half of the voltage level of regulated power supply node 1214.

Control circuit 1201 is configured to adjust a duration of at least one of phases 1213 using pulse-width modulation or any other suitable control mechanism. In various embodiments, control circuit 1201 may be configured to switch between buck mode and boost mode based on a control signal (not shown). Control circuit 1201 may be configured to generate multiple signals that control switch devices 1203-1206. The values of the signals can change during various ones of phases 1213 as well as whether power converter 1200 is operating in buck mode or boost mode. In various embodiments, control circuit 1201 may be implemented using a state machine or other sequential logic circuit in combination with suitable analog circuits configured to compare reference voltages to the voltage level of regulated power supply node 1214, and to sense a value of current flowing in inductor 1210.

Capacitors 1207-1209 may, in various embodiments, be implemented using a MOM structure, a MIM structure, or any other suitable capacitor structure available in a semiconductor manufacturing process. It is noted that inductor 1210 and capacitors 1207-1209 may be located on a common integrated circuit with switch devices 1203-1206. Alternatively, inductor 1210 and capacitors 1207-1209 may be located on a different integrated circuit than switch devices 1203-1206. It is further noted that in the embodiment of FIG. 12, the voltages across inductor 1210 can be less than traditional buck-boost converter circuits. As such, inductor 1210 can be reduced in size from traditional buck-boost power converter circuit implementations. Moreover, the magnetic losses associated with inductor 1210 may be lower than traditional buck-boost power converter circuit implementations.

Figure 13:
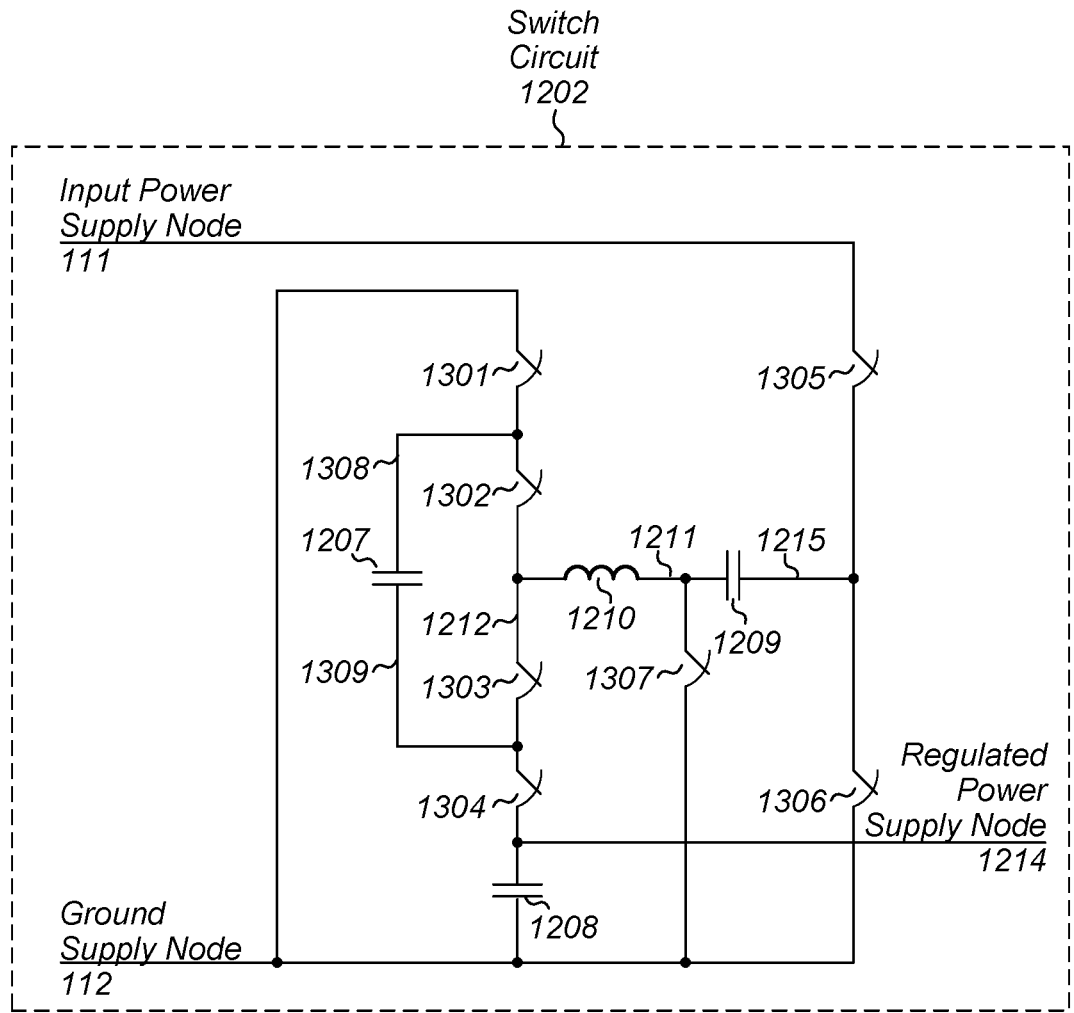
FIG. 13 is a block diagram of a switch circuit for an inverting buck-boost converter circuit.

Turning to FIG. 13, a block diagram of an embodiment of switch circuit 1202 is depicted. As illustrated, switch circuit 1202 includes capacitors 1207-1209, inductor 1210, and switches 1301-1307.

Switch 1301 is coupled between ground supply node 112 and node 1308, while switch 1302 is coupled between node 1308 and node 1212. In various embodiments, switches 1301 and 1302 may correspond to switch device 1203 as depicted in FIG. 12. Switch 1303 is coupled between node 1212 and node 1309, while switch 1304 is coupled between node 1309 and regulated power supply node 1214. In some embodiments, switches 1303 and 1304 may correspond to switch device 1204 as depicted in FIG. 12. Switch 1305 is coupled between input power supply node 111 and node 1215, while switch 1306 is coupled between node 1215 and ground supply node 112. In various embodiments, switches 1305 and 1306 may correspond to switch device 1206 as depicted in FIG. 12. Switch 1307, which may correspond to switch device 1205 as depicted in FIG. 12, is coupled between node 1211 and ground supply node 112.

Capacitor 1207 is coupled between node 1308 and node 1309, while capacitor 1208 is coupled between regulated power supply node 1214 and ground supply node 112. Capacitor 1209 is coupled between node 1211 and node 1215, and inductor 1210 is coupled between node 1211 and node 1212.

During a first phase of phases 1213, switches 1301 and 1302 are closed, along with switch 1306. Switches 1303, 1304, 1305, and 1307 are open. With this arrangement of switches, the series combination of inductor 1210 and capacitor 1209 is coupled on both ends to ground supply node 112, allowing the current through inductor 1210 to increase, thereby magnetizing inductor 1210 using charge from capacitor 1209. It is noted that capacitor 1209 has been previously charged to the voltage level of input power supply node 111. In various embodiments, capacitor 1209 functions as an inverting charge pump that provides a voltage level that can be used to magnetize inductor 1210.

During a second phase of phases 1213, switches 1301, 1303, 1305, and 1307 are closed, while switch 1306 is opened. This arrangement of switches couples both ends of the series combination of capacitor 1207 and to ground supply node 112, resulting in a negative voltage whose magnitude is half of the voltage level of regulated power supply node 1214 to be applied across inductor 1210. The reduction in voltage across inductor 1210 results in a decrease in the current flowing through inductor 1210 as it de-magnetizes. Additionally, capacitor 1209 is coupled between input power supply node 111 and ground supply node 112, charging capacitor 1209 to the voltage level of input power supply node 111.

During a third phase of phases 1213, switches 1302 and 1306 are closed, and switches 1303, 1305, and 1307 are opened. With this arrangement of switches, capacitor 1209 (which has been charged to the voltage level of input power supply node 111) is used to source current to inductor 1210, thereby magnetizing inductor 1210.

During a fourth phase of phases 1213, switches 1301 and 1306 are opened, and switches 1304 and 1307 are closed. This arrangement of switches results in a negative voltage whose magnitude is half of the voltage level of regulated power supply node 1214 to be applied across inductor 1210. The reduction in voltage across inductor 1210 results in a decrease in the current flowing through inductor 1210, de-magnetizing inductor 1210. At the same time, capacitor 1209 is coupled between input power supply node 111 and ground supply node 112 so as to be charged to the voltage level of input power supply node 111. At the conclusion of the fourth phase, the cycle of phases may repeat starting with the first phase.

Switches 1301-1307 may, in various embodiments, be implemented using any suitable combination of n-channel or p-channel MOSFETs, FinFETs, GAAFETs, or any other suitable transconductance devices. It is noted that in the embodiment of FIG. 13, the voltage levels across switches 1301-1304 are limited to half the voltage level of regulated power supply node 1214. As such, switches 1301-1304 may be implemented with MOSFETs, FinFETs, GAAFETs, and the like, that are smaller and have lower voltage ratings than similar devices in traditional buck-boost converter circuits.

Figure 14:
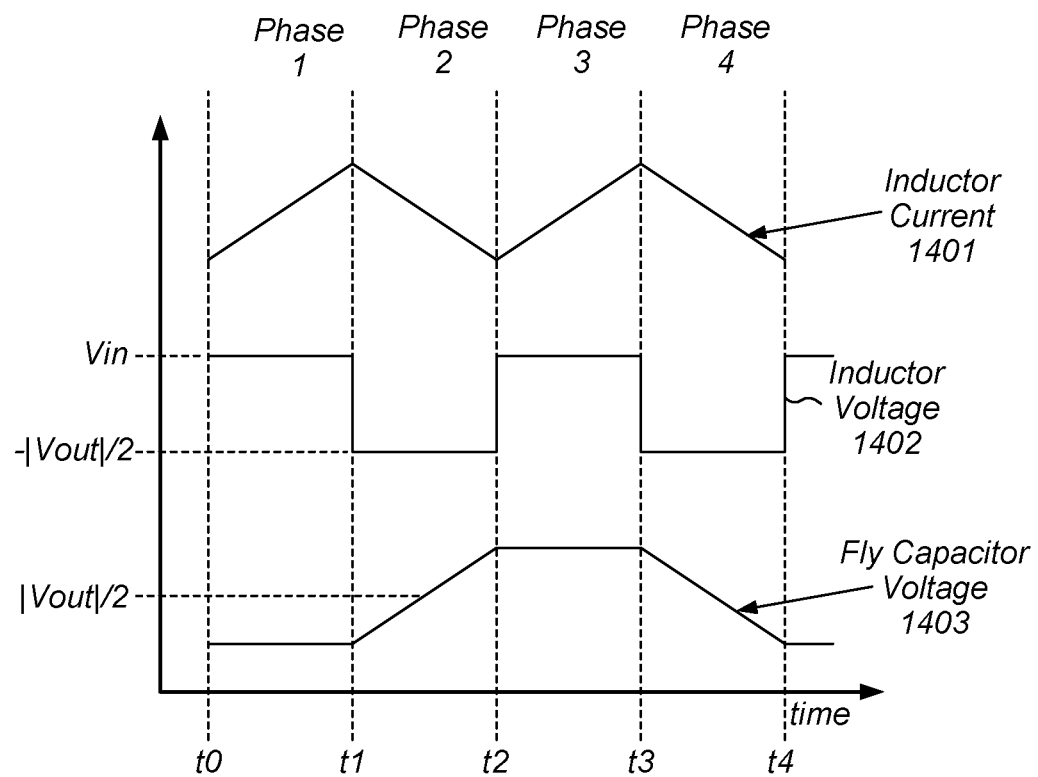
FIG. 14 illustrates example waveforms for an inverting buck-boost power converter circuit.

Waveforms associated with the operation of power converter circuit 1200 are depicted in FIG. 14. It is noted that the waveforms are merely examples and, in various embodiments, the waveforms may have different relative magnitudes and timings.

At time t0, a first phase of phases 1213 begins and a voltage level of inductor 1210 (denoted as "inductor voltage 1402") is set to the voltage level of input power supply node 111 (denoted as "Vin"), resulting in inductor current 1401 (which may corresponds to a current flowing in inductor 1210) increasing as inductor 1210 is magnetized.

At time t1, a second phase of phases 1213 begins and inductor voltage 1402 is set to a level corresponding to a negative polarity of half the magnitude of the voltage level of regulated power supply node 1214 (denoted as "−|Vout|/2"). This reduction in voltage causes inductor current 1401 to decrease, thereby de-magnetizing inductor 1210. Additionally, during the second phase, the voltage across capacitor 1207 (denoted as "fly capacitor voltage 1403") begins to increase.

At time t2, a third phase of phases 1213 begins. Inductor voltage 1402 is again set to Vin, which causes inductor current 1401 to increase and inductor 1210 to magnetize. At this point, fly capacitor voltage 1403 has reached its final level corresponding to the magnitude of the voltage level of regulated power supply node 1214.

At time t3, a fourth phase of phases 1213 begins. Inductor voltage 1402 is again set to −|Vout|/2, resulting in a decrease in inductor current 1401 as inductor 1210 de-magnetizes. During this phase, charge is transferred to regulated power supply node 1214, resulting in a decrease in fly capacitor voltage 1403.

The fourth phase ends at time t4, at which point another cycle of phases 1-4 may begin again. Phases 1-4 may be repeated as often as needed to maintain a desired voltage level on regulated power supply node 1214.

To summarize, various embodiments of a multi-level power converter circuit are disclosed. Broadly speaking, an apparatus is contemplated in which a switch circuit coupled to a regulated power supply node includes an inductor, a first capacitor, a second capacitor, and a plurality of switch devices. The switch circuit is configured, for a particular switching sequence of a plurality of switching sequences, to magnetize the inductor using the first capacitor and the second capacitor during a first phase of the particular switching sequence. The switch circuit is further configured to de-magnetize the inductor, charge the first capacitor, and transfer a first amount of charge to the regulated power supply node during a second phase of the particular switching sequence.

The switch circuit is also configured to magnetize the inductor using the first capacitor and the second capacitor, and transfer a second amount of charge to the regulated power supply node during a third phase of the particular switching sequence, and de-magnetize the inductor, charge the first capacitor, and transfer a third amount of charge to the regulated power supply node during a fourth phase of the particular switching sequence. A control circuit is configured to select the particular switching sequence based on respective voltage levels of an input power supply node and the regulated power supply node.

In another embodiment, the switch circuit is configured to magnetize the inductor during a first phase of a plurality of phases, and charge a capacitor included in the power converter circuit using respective voltage levels of a first input power supply node and a second input power supply node during the first phase. The switch circuit is further configured to de-magnetize the inductor and float the capacitor during a second phase of the plurality of phases, and magnetize the inductor and discharge the capacitor during a third phase of the plurality of phases. The switch circuit is also configured to de-magnetize the inductor and float the capacitor during a fourth phase of the plurality of phases.

In some embodiments, the switch circuit includes an inductor, a first capacitor, a second capacitor, a third capacitor coupled between the regulated power supply node and a ground supply node, and a plurality of switch devices. The switch circuit is configured to generate a voltage level on a regulated power supply node that is less than zero. To generate the voltage level on the regulated power supply node, the switch circuit is configured to magnetize the inductor using the first capacitor during a first phase of a plurality of phases, and de-magnetize the inductor using the second capacitor, charge the first capacitor using a voltage level of an input power supply, and exchange a first amount of charge with the regulated power supply node during a second phase of the plurality of phases. The switch circuit is further configured to magnetize the inductor using the first capacitor during a third phase of the plurality of phases, and de-magnetize the inductor, charge the first capacitor using the voltage level of the input power supply, and exchange a second amount of charge with the regulated power supply node during a fourth phase of the plurality of phases. In such cases, the control circuit is further configured to adjust a duration of a given phase of the plurality of phases based on a current flowing through the inductor during the given phase.

Figure 15:
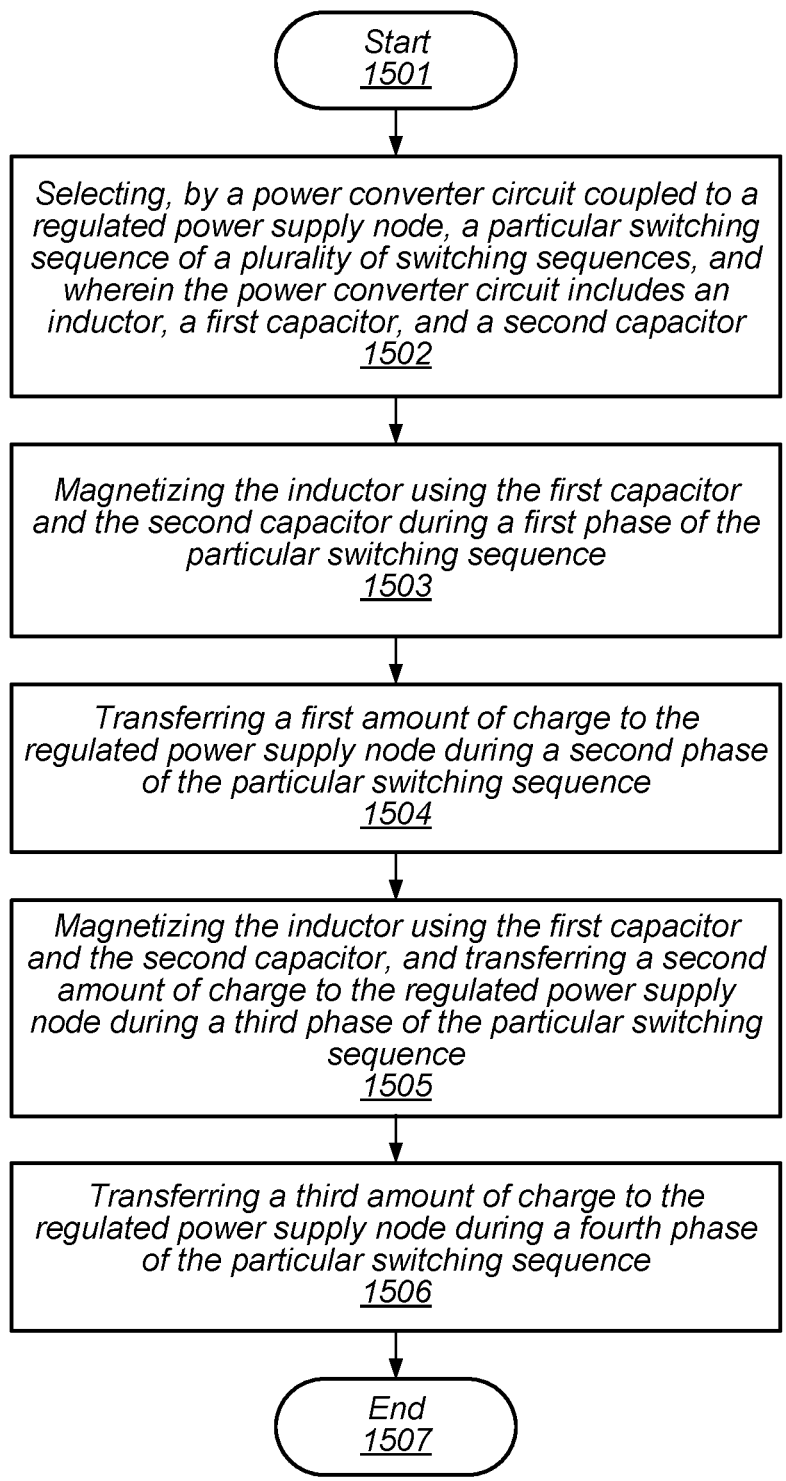
FIG. 15 is a flow diagram of an embodiment of a method for operating a multi-level boost power converter circuit.

Turning to FIG. 15, a flow diagram depicting an embodiment of a method for operating a power converter circuit is illustrated. The method, which may be applied to various power converter circuits including multi-level boost converter circuit 100, begins in block 1501.

The method includes selecting, by a power converter circuit coupled to a regulated power supply node, a particular switching sequence of a plurality of switching sequences (block 1502). In various embodiments, the power converter circuit includes an inductor, a first capacitor, and a second capacitor. In some embodiments, selecting the particular switching sequence includes comparing a voltage level of an input power supply node to a voltage level of the regulated power supply node, and selecting the particular switching sequence in response to determining that the voltage level of the input power supply node is greater than one-quarter of the voltage level of the regulated power supply node, and that the voltage level of the input power supply node is less than one-half of the voltage level of the regulated power supply node.

The method also includes magnetizing the inductor using the first capacitor and the second capacitor during a first phase of the particular switching sequence (block 1503). In some embodiments, magnetizing the inductor during the first phase includes coupling the inductor, the first capacitor, and the second capacitor in series between an input power supply node and a ground supply node.

The method further includes transferring a first amount of charge to the regulated power supply node during a second phase of the particular switching sequence (block 1504). In various embodiments, transferring the first amount of charge to the regulated power supply node includes coupling the first capacitor between the input power supply node and the ground supply node, floating a first terminal of the second capacitor, and coupling the inductor between the input power supply node and the regulated power supply node.

The method also includes magnetizing the inductor using the first capacitor and the second capacitor, and transferring a second amount of charge to the regulated power supply node during a third phase of the particular switching sequence (block 1505). In some embodiments, magnetizing the inductor and transferring the second amount of charge to the regulated power supply node includes coupling the first capacitor, the inductor, and the second capacitor in series between the input power supply node and the regulated power supply node.

The method further includes transferring a third amount of charge to the regulated power supply node during a fourth phase of the particular switching sequence (block 1506). In various embodiments, transferring the third amount of charge to the regulated power supply node includes coupling the first capacitor between the input power supply node and the ground supply node, floating a first terminal of the second capacitor, and coupling the inductor between the input power supply node and the regulated power supply node.

In other embodiments, the method also includes selecting a different switching sequence of the plurality of switching sequences in response to determining that the voltage level of the input power supply node is less than one-quarter of the voltage level of the regulated power supply node. The method may further include magnetizing the inductor and charging the first capacitor during a fifth phase of the plurality of second phases, and de-magnetizing the inductor using the first capacitor and the second capacitor during a sixth phase of the plurality of second phases subsequent to the fifth phase. In various embodiments, the method also includes magnetizing the inductor using the first capacitor and the second capacitor and transferring charge to the regulated power supply node during a third phase of the plurality of phases subsequent to the second phase, and transferring charge to the regulated power supply node during a fourth phase of the plurality of phases subsequent to the third phase. The method ends in block 1507.

Figure 16:
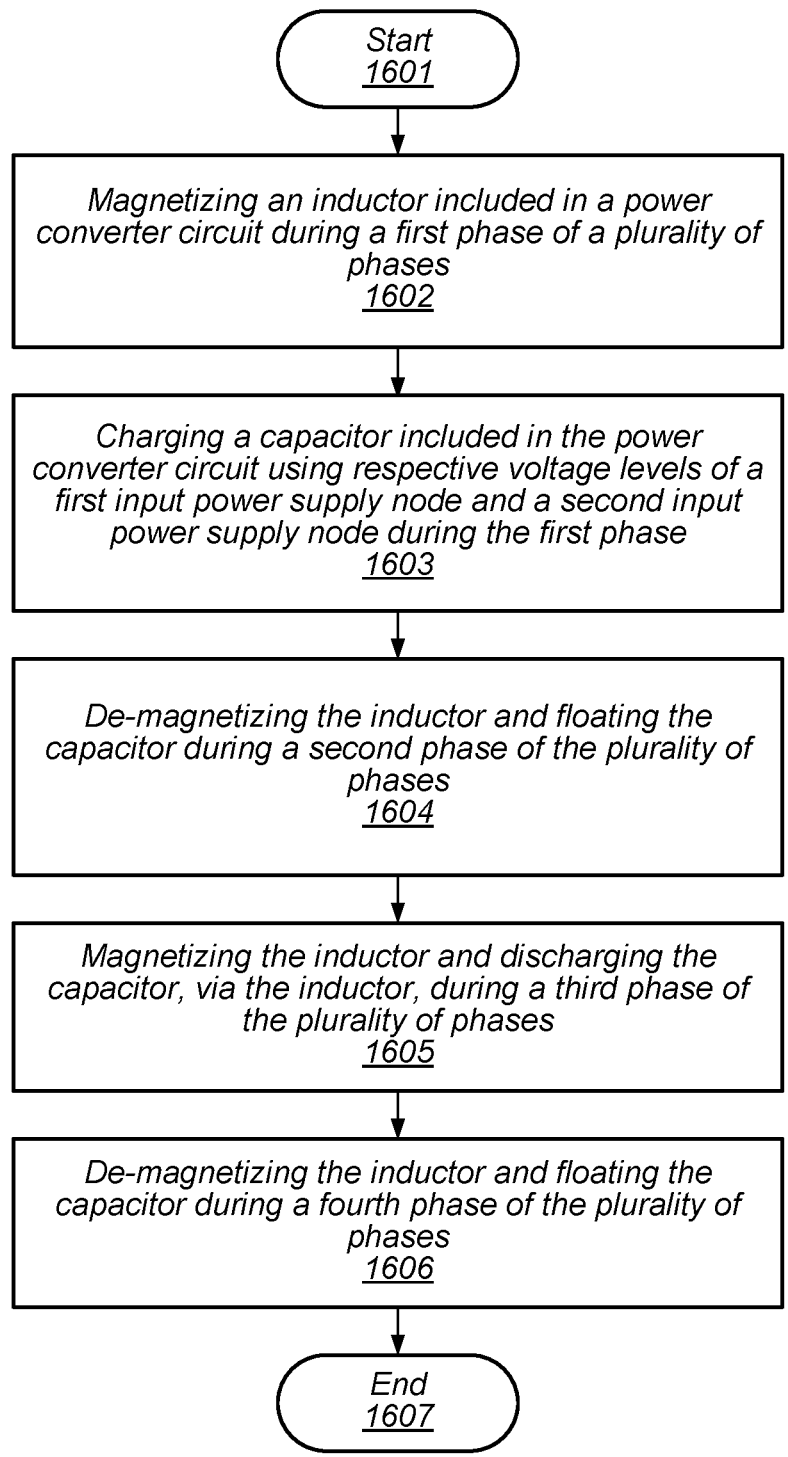
FIG. 16 is a flow diagram of an embodiment of a method for operating a multi-level buck power converter circuit.

Turning to FIG. 16, a flow diagram depicting an embodiment of a method for operating a multi-level buck power converter circuit. The method, which may be applied to various multi-level buck power converter circuits, including power converter circuit 500 as depicted in FIG. 5, begins in block 1601.

The method includes magnetizing an inductor included in a power converter circuit during a first phase of a plurality of phases (block 1602). In various embodiments, the inductor is coupled to a regulated power supply node. In some cases, magnetizing the inductor during the first phase includes coupling the inductor between the second input power supply node and the regulated power supply node.

The method also includes charging a capacitor included in the power converter circuit using respective voltage levels of a first input power supply node and a second input power supply node during the first phase (block 1603). In various embodiments, charging the capacitor includes charging the capacitor using a difference between the respective voltage levels of the first input power supply and the second input power supply node. In some cases, charging the capacitor also includes coupling the capacitor between the first input power supply node and the second input power supply node.

The method further includes de-magnetizing the inductor and floating the capacitor during a second phase of the plurality of phases (block 1604). In some embodiments, de-magnetizing the inductor during the second phase includes coupling the inductor between the regulated power supply node and a ground supply node.

The method also includes magnetizing the inductor and discharging the capacitor, via the inductor, into the regulated power supply node during a third phase of the plurality of phases (block 1605). In some embodiments, magnetizing the inductor during the third phase includes coupling the inductor between a first terminal of the capacitor and the regulated power supply node, and coupling a second terminal of the inductor to a ground supply node.

The method further includes de-magnetizing the inductor and floating the capacitor during a fourth phase of the plurality of phases (block 1606). In various embodiments, de-magnetizing the inductor during the fourth phase includes coupling the inductor between the regulated power supply node and a ground supply node, and de-coupling the first terminal of the capacitor from the inductor. The method concludes in block 1607.

Figure 17:
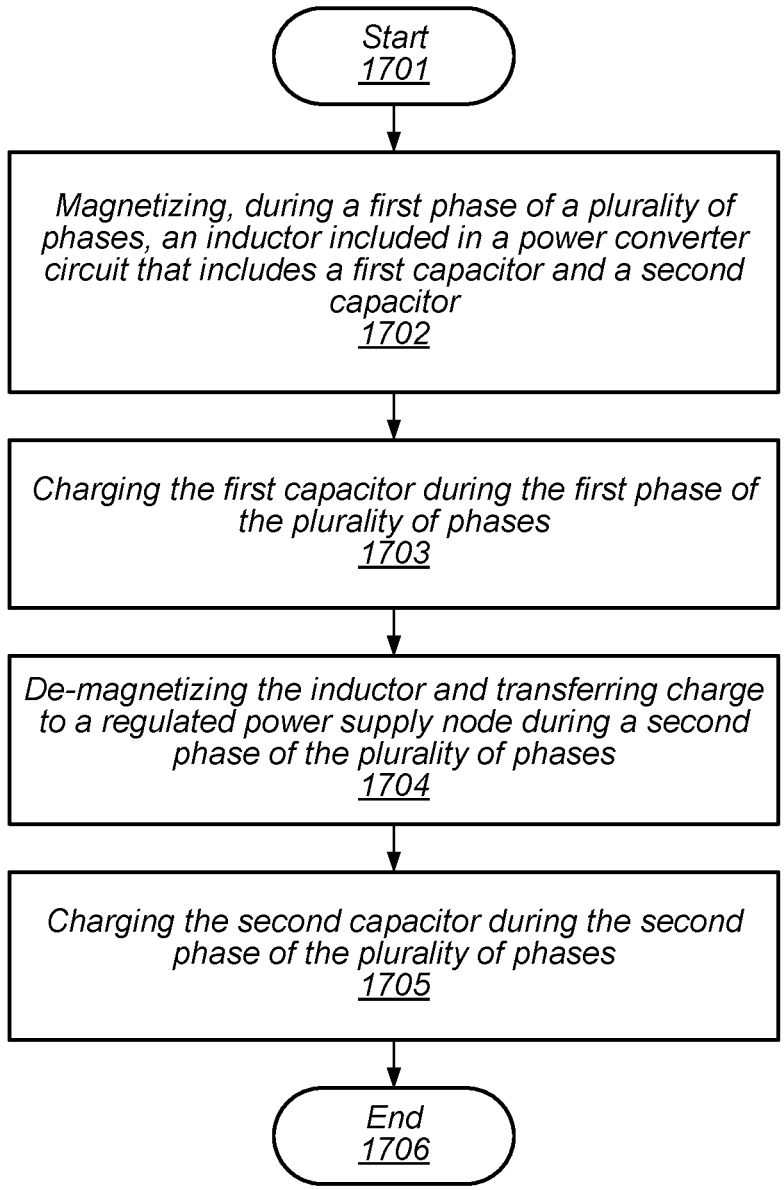
FIG. 17 is a flow diagram of an embodiment of a method for operating a boost power converter circuit with multiple fly capacitors.

Turning to FIG. 17, a flow diagram depicting an embodiment of a method for operating a boost power converter circuit with multiple fly capacitors is illustrated. The method, which may be applied to various boost power converter circuits, including power converter circuit 800 as depicted in FIG. 8, begins in block 1701.

The method includes magnetizing, during a first phase of a plurality of phases, an inductor included in a power converter circuit that includes a first capacitor and a second capacitor (block 1702). In some embodiments, magnetizing the inductor during the first phase may include coupling the inductor between an input power supply node and a ground supply node.

The method also includes charging the first capacitor during the first phase of the plurality of phases (block 1703). In various embodiments, charging the first capacitor during the first phase includes coupling a first terminal of the first capacitor to the input power supply node and a second terminal of the first capacitor to the ground supply node.

The method further includes de-magnetizing the inductor and transferring charge to a regulated power supply node during a second phase of the plurality of phases (block 1704). In various embodiments, de-magnetizing the inductor includes coupling the inductor between the input power supply node and a first terminal of the first capacitor, and coupling a second terminal of the first capacitor to the regulated power supply node.

The method also includes charging the second capacitor during the second phase of the plurality of phases (block 1705). In some embodiments, the method may also include generating a boost voltage using the second capacitor. The method can also include activating, during the second phase, a switch coupled between the first capacitor and the regulated power supply node using the boost voltage. The method concludes in block 1706.

Figure 18:
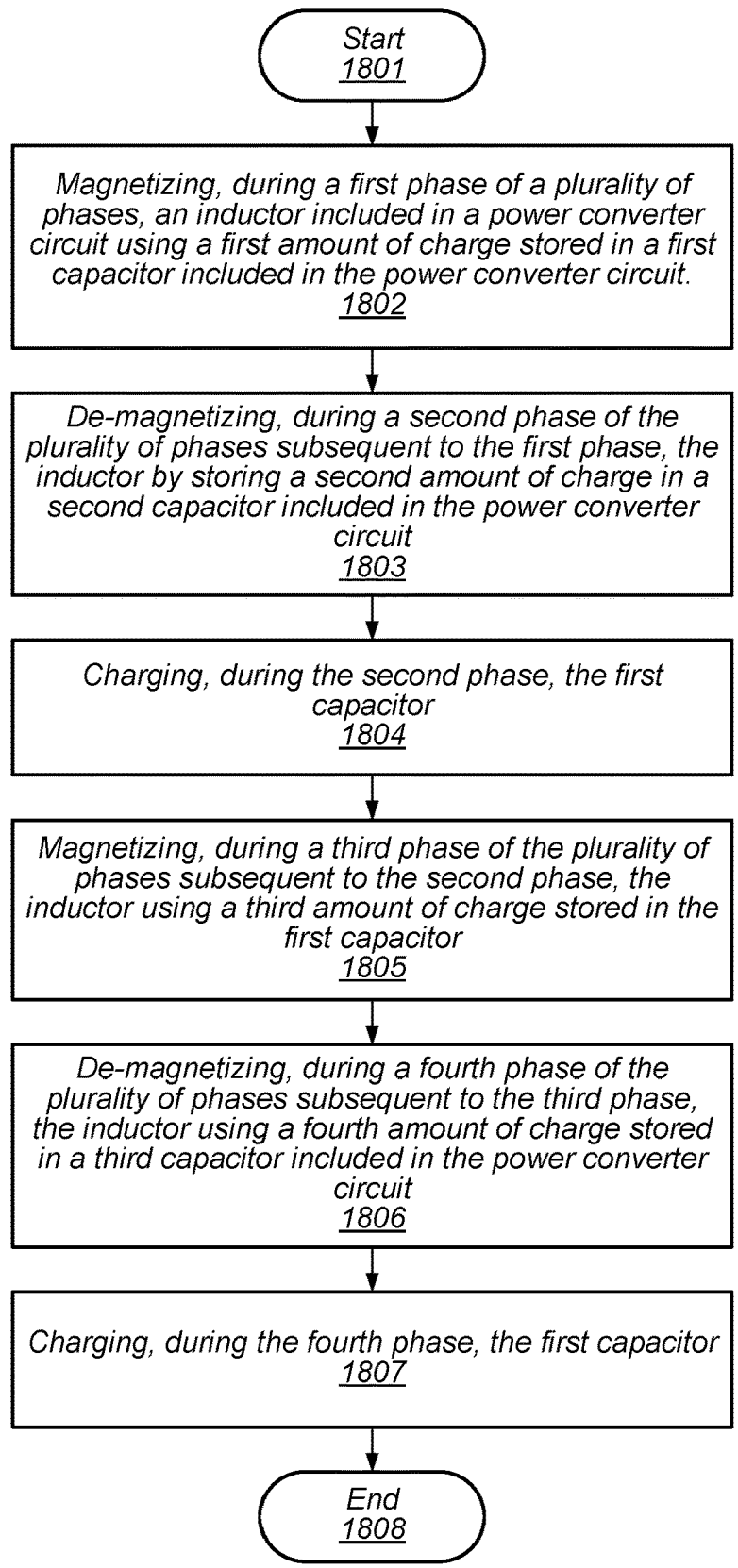
FIG. 18 is a flow diagram of an embodiment of a method for operating an inverting buck-boost power converter circuit.

Turning to FIG. 18, a flow diagram depicting an embodiment of a method for operating an inverting buck-boost power converter circuit is illustrated. The method, which may be applied to various inverting buck-boost power converter circuits such as power converter circuit 1200, begins in block 1801. It is noted that the inverting buck-boost power converter circuit can be operating in either buck mode or boost mode.

The method includes magnetizing, during a first phase of a plurality of phases, an inductor included in a power converter circuit using a first amount of charge stored in a first capacitor included in the power converter circuit (block 1802). In various embodiments, magnetizing the inductor, during the first phase, includes coupling a first terminal of the inductor to a ground supply node, coupling a second terminal of the inductor to a first terminal of the first capacitor, and coupling a second terminal of the first capacitor to the ground supply node.

The method also includes de-magnetizing, during a second phase of the plurality of phases subsequent to the first phase, the inductor by storing a second amount of charge in a second capacitor included in the power converter circuit (block 1803).

The method further includes charging, during the second phase, the first capacitor (block 1804). In various embodiments, charging the first capacitor, during the second phase, includes coupling the first capacitor between an input power supply node and a ground supply node.

The method also includes magnetizing, during a third phase of the plurality of phases subsequent to the second phase, the inductor using a third amount of charge stored in the first capacitor (block 1805).

The method further includes de-magnetizing, during a fourth phase of the plurality of phases subsequent to the third phase, the inductor using a fourth amount of charge stored in a third capacitor included in the power converter circuit (block 1806). In various embodiments, de-magnetizing the inductor includes generating a particular voltage level of a regulated power supply node.

The method also includes charging, during the fourth phase, the first capacitor (block 1807). In various embodiments, charging the first capacitor, during the fourth phase, includes coupling the first capacitor between the input power supply node and the ground supply node. In some embodiments, the method also includes adjusting the duration of at least one phase of the plurality of phases based on a voltage level of the regulated power supply node. The method concludes in block 1808.

Figure 19:
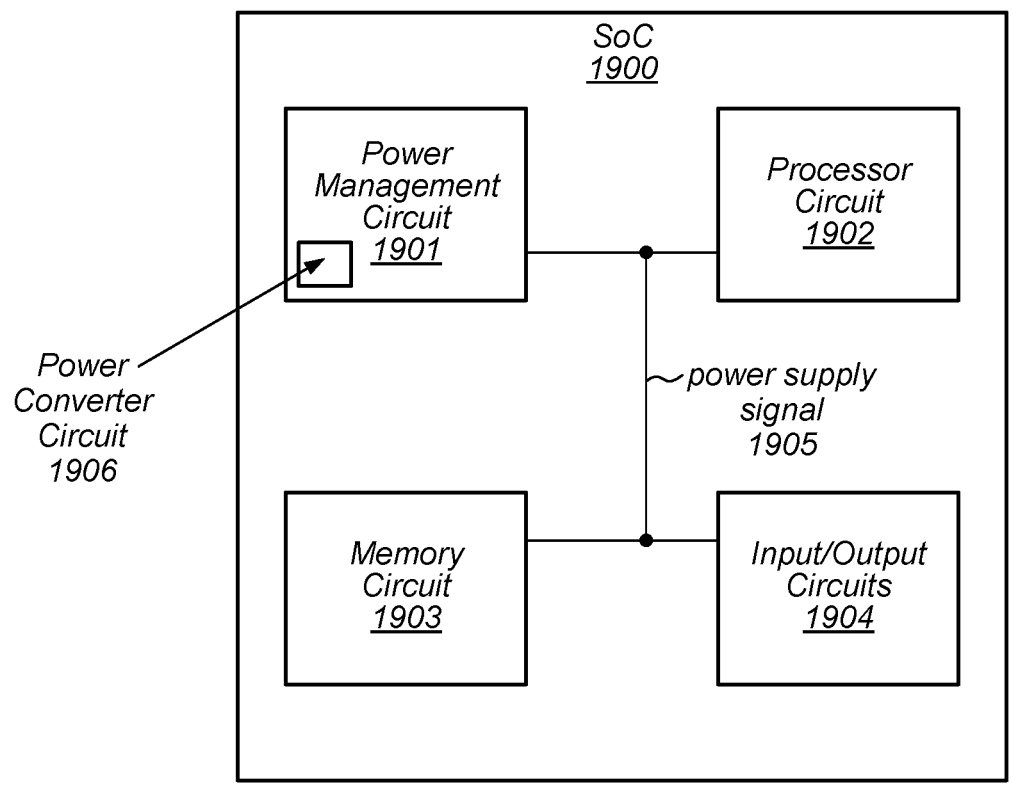
FIG. 19 is a block diagram of one embodiment of a system-on-a-chip that includes a power management circuit.

A block diagram of a system-on-a-chip (SoC) is illustrated in FIG. 19. In the illustrated embodiment, SoC 1900 includes power management circuit 1901, processor circuit 1902, input/output circuits 1904, and memory circuit 1903, each of which is coupled to power supply signal 1905. In various embodiments, SoC 1900 may be configured for use in a desktop computer, server, or in a mobile computing application such as, e.g., a tablet, laptop computer, or wearable computing device.

Power management circuit 1901 includes power converter circuit 1906, which is configured to generate a regulated voltage level on power supply signal 1905 in order to provide power to processor circuit 1902, input/output circuits 1904, and memory circuit 1903. Although power management circuit 1901 is depicted as including a single power converter circuit, in other embodiments, any suitable number of power converter circuits may be included in power management circuit 1901, each configured to generate a regulated voltage level on a respective one of multiple internal power supply signals included in SoC 1900. In various embodiments, power converter circuit 1906 may correspond to any of power converter circuits 100, 500, 800, or 1200.

Processor circuit 1902 may, in various embodiments, be representative of a general-purpose processor that performs computational operations. For example, processor circuit 1902 may be a central processing unit (CPU) such as a microprocessor, a microcontroller, an application-specific integrated circuit (ASIC), or a field-programmable gate array (FPGA).

Memory circuit 1903 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 19, in other embodiments, any suitable number of memory circuits may be employed.

Input/output circuits 1904 may be configured to coordinate data transfer between SoC 1900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1904 may be configured to implement a version of Universal Serial Bus (USB) protocol or IEEE 1394 (Firewire®) protocol.

Input/output circuits 1904 may also be configured to coordinate data transfer between SoC 1900 and one or more devices (e.g., other computing systems or integrated circuits) coupled to SoC 1900 via a network. In one embodiment, input/output circuits 1904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1904 may be configured to implement multiple discrete network interface ports.

Figure 20:
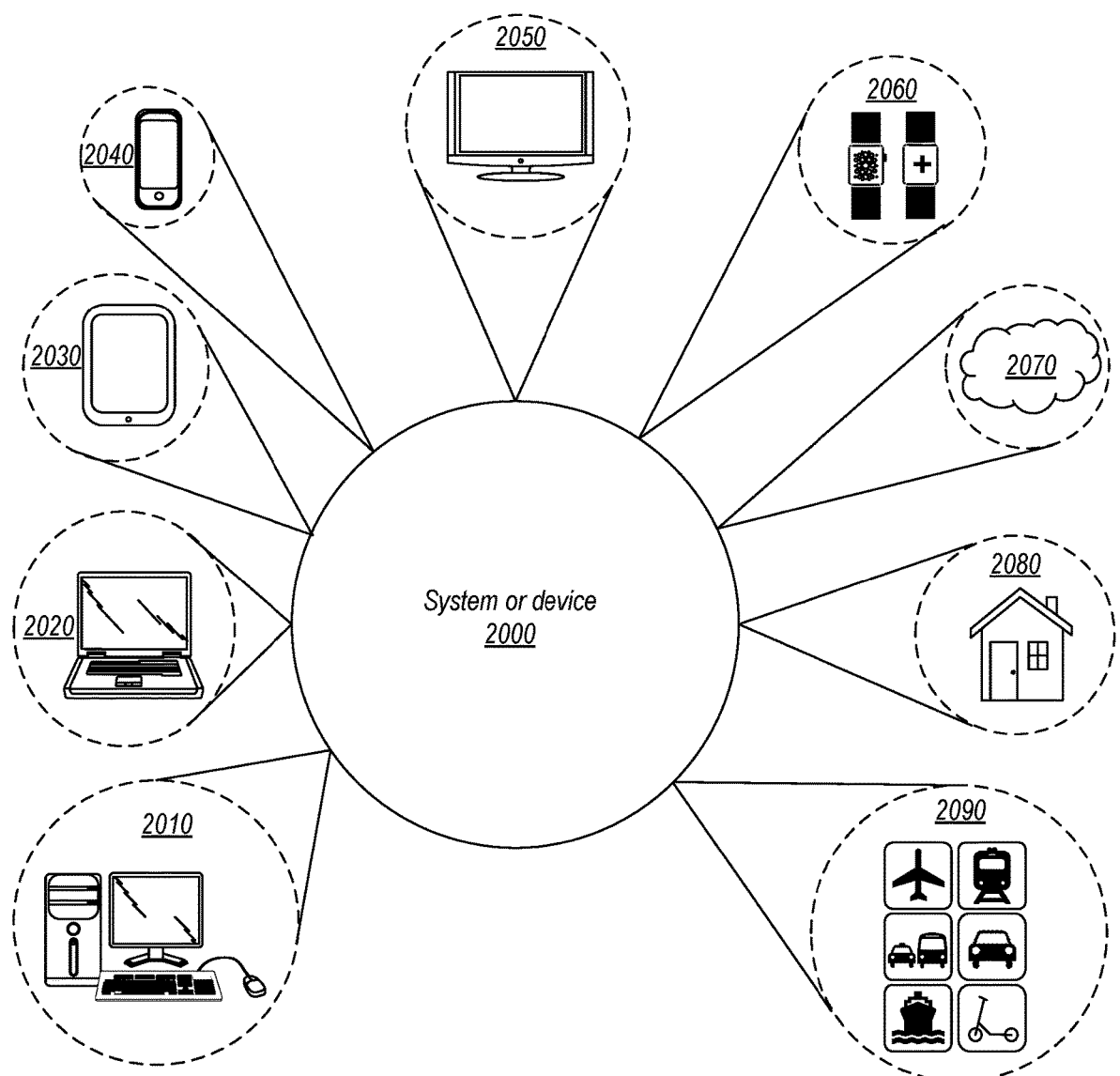
FIG. 20 is a block diagram of various embodiments of computer systems that may include power converter circuits.

Turning now to FIG. 20, various types of systems that may include any of the circuits, devices, or systems discussed above are illustrated. System or device 2000, which may incorporate or otherwise utilize one or more of the techniques described herein, may be utilized in a wide range of areas. For example, system or device 2000 may be utilized as part of the hardware of systems such as a desktop computer 2010, laptop computer 2020, tablet computer 2030, cellular or mobile phone 2040, or television 2050 (or set-top box coupled to a television).

Similarly, disclosed elements may be utilized in a wearable device 2060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 2000 may also be used in various other contexts. For example, system or device 2000 may be utilized in the context of a server computer system, such as a dedicated server or on shared hardware that implements a cloud-based service 2070. Still further, system or device 2000 may be implemented in a wide range of specialized everyday devices, including devices 2080 commonly found in the home such as refrigerators, thermostats, security cameras, etc. The interconnection of such devices is often referred to as the "Internet of Things" (IoT). Elements may also be implemented in various modes of transportation. For example, system or device 2000 could be employed in the control systems, guidance systems, entertainment systems, etc. of various types of vehicles 2090.

The applications illustrated in FIG. 20 are merely exemplary and are not intended to limit the potential future applications of disclosed systems or devices. Other example applications include, without limitation: portable gaming devices, music players, data storage devices, unmanned aerial vehicles, etc.

Figure 21:
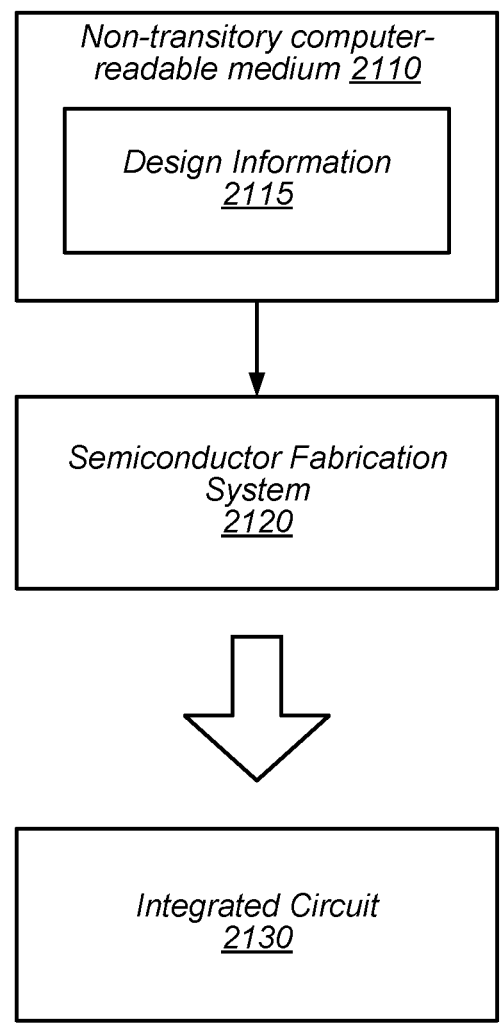
FIG. 21 illustrates an example of a non-transitory computer-readable storage medium that stores circuit design information.

FIG. 21 is a block diagram illustrating an example of a non-transitory computer-readable storage medium that stores circuit design information, according to some embodiments. In the illustrated embodiment, semiconductor fabrication system 2120 is configured to process design information 2115 stored on non-transitory computer-readable storage medium 2110 and fabricate integrated circuit 2130 based on design information 2115.

Non-transitory computer-readable storage medium 2110 may comprise any of various appropriate types of memory devices or storage devices. Non-transitory computer-readable storage medium 2110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 2110 may include other types of non-transitory memory as well or combinations thereof. Non-transitory computer-readable storage medium 2110 may include two or more memory mediums, which may reside in different locations, e.g., in different computer systems that are connected over a network.

Design information 2115 may be specified using any of various appropriate computer languages, including hardware description languages such as, without limitation: VHDL, Verilog, SystemC, SystemVerilog, RHDL, M, MyHDL, etc. Design information 2115 may be usable by semiconductor fabrication system 2120 to fabricate at least a portion of integrated circuit 2130. The format of design information 2115 may be recognized by at least one semiconductor fabrication system, such as semiconductor fabrication system 2120, for example. In some embodiments, design information 2115 may include a netlist that specifies elements of a cell library, as well as their connectivity. One or more cell libraries used during logic synthesis of circuits included in integrated circuit 2130 may also be included in design information 2115. Such cell libraries may include information indicative of device or transistor-level netlists, mask design data, characterization data, and the like, of cells included in the cell library.

Integrated circuit 2130 may, in various embodiments, include one or more custom macrocells, such as memories, analog or mixed-signal circuits, and the like. In such cases, design information 2115 may include information related to included macrocells. Such information may include, without limitation, schematics capture database, mask design data, behavioral models, and device or transistor-level netlists. As used herein, mask design data may be formatted according to graphic data system (GDSII), or any other suitable format.

Semiconductor fabrication system 2120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2120 may also be configured to perform various testing of fabricated circuits for correct operation.

In various embodiments, integrated circuit 2130 is configured to operate according to a circuit design specified by design information 2115, which may include performing any of the functionality described herein. For example, integrated circuit 2130 may include any of various elements shown or described herein. Further, integrated circuit 2130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third," when applied to a particular feature, do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a switch circuit coupled to a regulated power supply node and including an inductor, a first capacitor, a second capacitor, and a plurality of switch devices, wherein the switch circuit is configured, for a particular switching sequence of a plurality of switching sequences, to:
      magnetize the inductor using the first capacitor and the second capacitor during a first phase of the particular switching sequence;
      de-magnetize the inductor, charge the first capacitor, and transfer a first amount of charge to the regulated power supply node during a second phase of the particular switching sequence;
      magnetize the inductor using the first capacitor and the second capacitor, and transfer a second amount of charge to the regulated power supply node during a third phase of the particular switching sequence; and
      de-magnetize the inductor, charge the first capacitor, and transfer a third amount of charge to the regulated power supply node during a fourth phase of the particular switching sequence; and
   a control circuit configured to select the particular switching sequence based on respective voltage levels of an input power supply node and the regulated power supply node.

2. The apparatus of claim 1, wherein to magnetize the inductor during the first phase, the switch circuit is further configured to couple the inductor, the first capacitor, and the second capacitor in series between the input power supply node and a ground supply node.

3. The apparatus of claim 1, wherein to transfer the first amount of charge to the regulated power supply node during the second phase, the switch circuit is further configured to:
   couple the first capacitor between the input power supply node and a ground supply node;
   float a first terminal of the second capacitor; and
   couple the inductor between the input power supply node and the regulated power supply node.

4. The apparatus of claim 1, wherein to magnetize the inductor and transfer the second amount of charge to the regulated power supply node during the third phase, the switch circuit is further configured to couple the first capacitor, the inductor, and the second capacitor in series between the input power supply node and the regulated power supply node.

5. The apparatus of claim 1, wherein to transfer the third amount of charge to the regulated power supply node during the fourth phase, the switch circuit is further configured to:
   couple the first capacitor between the input power supply node and a ground supply node;
   float a first terminal of the second capacitor; and
   couple the inductor between the input power supply node and the regulated power supply node.

6. The apparatus of claim 1, wherein to select the particular switching sequence, the control circuit is further configured to:
   compare a first voltage level of the input power supply node to a second voltage level of the regulated power supply node; and
   select the particular switching sequence in response to a determination that the first voltage level of the input power supply node is greater than one-quarter of the second voltage level of the regulated power supply node, and that the first voltage level of the input power supply node is less than one-half of the second voltage level of the regulated power supply node.

7. The apparatus of claim 1, wherein the switch circuit is further coupled to the input power supply node, the switch circuit further including a third capacitor coupled between the regulated power supply node and a ground supply node, and wherein a voltage level of the regulated power supply node is less than zero.

8. The apparatus of claim 7, wherein the control circuit is further configured to adjust a duration of a given phase of a plurality of phases based on a current flowing through the inductor during the given phase, and wherein the plurality of phases include the first phase, the second phase, the third phase, and the fourth phase.

9. A method, comprising:
selecting, by a control circuit of a power converter circuit, a particular switching sequence based on respective voltage levels of an input power supply node of the power converter circuit and a regulated power supply node of the power converter circuit, the power converter circuit including a switch circuit coupled to the regulated power supply node, wherein the switch circuit includes an inductor, a first capacitor, a second capacitor, and a plurality of switch devices;
magnetizing, by the first capacitor and the second capacitor during a first phase of the particular switching sequence, the inductor;
transferring a first amount of charge to the regulated power supply node during a second phase of the particular switching sequence, wherein transferring the first amount of charge includes de-magnetizing the inductor to charge the first capacitor;
transferring a second amount of charge to the regulated power supply node during a third phase of the particular switching sequence, wherein transferring the second amount of charge includes magnetizing the inductor using the first capacitor and the second capacitor; and
transferring a third amount of charge to the regulated power supply node during a fourth phase of the particular switching sequence, wherein transferring the third amount of charge includes de-magnetizing the inductor and charging the first capacitor.

10. The method of claim 9, wherein:
magnetizing the inductor during the first phase includes coupling the inductor, the first capacitor, and the second capacitor in series between the input power supply node and a ground supply node; and
transferring the first amount of charge to the regulated power supply node during the second phase includes:
coupling the first capacitor between the input power supply node and a ground supply node;
floating a first terminal of the second capacitor; and
coupling the inductor between the input power supply node and the regulated power supply node.

11. The method of claim 10, further comprising:
magnetizing the inductor and transferring the second amount of charge to the regulated power supply node during the third phase includes coupling the first capacitor, the inductor, and the second capacitor in series between the input power supply node and the regulated power supply node.

12. The method of claim 11, further comprising:
transferring the third amount of charge to the regulated power supply node during the fourth phase includes:
coupling the first capacitor between the input power supply node and a ground supply node;
floating a first terminal of the second capacitor; and
coupling the inductor between the input power supply node and the regulated power supply node.

13. An apparatus, comprising:
a power management circuit, the power management circuit including a power converter circuit, wherein the power converter circuit includes:
a switch circuit coupled to a regulated power supply node and including an inductor, a first capacitor, a second capacitor, and a plurality of switch devices, wherein the switch circuit is configured, for a particular switching sequence of a plurality of switching sequences, to:
magnetize the inductor using the first capacitor and the second capacitor during a first phase of the particular switching sequence;
de-magnetize the inductor, charge the first capacitor, and transfer a first amount of charge to the regulated power supply node during a second phase of the particular switching sequence;
magnetize the inductor using the first capacitor and the second capacitor, and transfer a second amount of charge to the regulated power supply node during a third phase of the particular switching sequence; and
de-magnetize the inductor, charge the first capacitor, and transfer a third amount of charge to the regulated power supply node during a fourth phase of the particular switching sequence; and
a control circuit configured to select the particular switching sequence based on respective voltage levels of an input power supply node and the regulated power supply node.

14. The apparatus of claim 13, wherein to magnetize the inductor during the first phase, the switch circuit is further configured to couple the inductor, the first capacitor, and the second capacitor in series between the input power supply node and a ground supply node.

15. The apparatus of claim 13, wherein to transfer the first amount of charge to the regulated power supply node during the second phase, the switch circuit is further configured to:
couple the first capacitor between the input power supply node and a ground supply node;
float a first terminal of the second capacitor; and
couple the inductor between the input power supply node and the regulated power supply node.

16. The apparatus of claim 13, wherein to magnetize the inductor and source a second current to the regulated power supply node during the third phase, the switch circuit is further configured to couple the first capacitor, the inductor, and the second capacitor in series between the input power supply node and the regulated power supply node.

17. The apparatus of claim 13, wherein to transfer the third amount of charge to the regulated power supply node during the fourth phase, the switch circuit is further configured to:
couple the first capacitor between the input power supply node and a ground supply node;
float a first terminal of the second capacitor; and
couple the inductor between the input power supply node and the regulated power supply node.

18. The apparatus of claim 13, wherein to select the particular switching sequence, the control circuit is further configured to:
compare a voltage level of the input power supply node to a voltage level of the regulated power supply node; and
select the particular switching sequence in response to a determination that the voltage level of the input power supply node is greater than one-quarter of the voltage level of the regulated power supply node, and that the voltage level of the input power supply node is less than one-half of the voltage level of the regulated power supply node.

19. The apparatus of claim 13, wherein to select the particular switching sequence, the control circuit is further configured to:

select the particular switching sequence in response to a determination that a voltage level of an input power supply node is greater than one-quarter of the voltage level of the regulated power supply node, and that the voltage level of the input power supply node is less than one-half of the voltage level of the regulated power supply node.

20. The apparatus of claim 13, wherein the power management circuit is coupled to:

a processor circuit;
a memory circuit; and
one or more input/output circuits.

\* \* \* \* \*